United States Patent
Anderson et al.

(10) Patent No.: US 11,243,708 B2
(45) Date of Patent: *Feb. 8, 2022

(54) PROVIDING TRACK FORMAT INFORMATION WHEN MIRRORING UPDATED TRACKS FROM A PRIMARY STORAGE SYSTEM TO A SECONDARY STORAGE SYSTEM

(71) Applicant: INTERNATIONAL BUSINESS MACHINES CORPORATION, Armonk, NY (US)

(72) Inventors: Kyler A. Anderson, Sahuarita, AZ (US); Kevin J. Ash, Tucson, AZ (US); Matthew G. Borlick, Tucson, AZ (US); Lokesh M. Gupta, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/737,877

(22) Filed: Jan. 8, 2020

(65) Prior Publication Data
US 2020/0142599 A1    May 7, 2020

Related U.S. Application Data

(63) Continuation of application No. 15/666,525, filed on Aug. 1, 2017, now Pat. No. 10,579,296.

(51) Int. Cl.
*G06F 3/06* (2006.01)
*G06F 11/20* (2006.01)
*G06F 11/16* (2006.01)

(52) U.S. Cl.
CPC .............. *G06F 3/065* (2013.01); *G06F 3/067* (2013.01); *G06F 3/0617* (2013.01);
(Continued)

(58) Field of Classification Search
CPC .. G06F 3/065; G06F 12/0866; G06F 2201/82; G06F 2212/286; G06F 12/0868;
(Continued)

(56) References Cited

U.S. PATENT DOCUMENTS 6,832,290 B2    12/2004 Todd
7,139,933 B2    11/2006 Hsu et al.
(Continued)

OTHER PUBLICATIONS

Office Action dated Sep. 3, 2020, pp. 31, for U.S. Appl. No. 16/565,376.
List of Patentas and Applications Treated as Related, dated Jan. 8, 2020, Total 2 pages.
IBM; "System, Method and Service for Automated Capacity Expansion of a Data Deduplication Repository"; http://ip.com/IPCOM/000184411D; Jun. 23, 2009, pp. 3.
(Continued)

*Primary Examiner* — Reginald G Bragdon
*Assistant Examiner* — Thanh D Vo
(74) *Attorney, Agent, or Firm* — Konrad Raynes Davda & Victor LLP; David W. Victor

(57) ABSTRACT

Provided are a computer program product, system, and method for providing track format information when mirroring updated tracks from a primary storage system to a secondary storage system. The primary storage system determines a track to mirror to the secondary storage system and determines whether there is track format information for the track to mirror. The track format information indicates a format and layout of data in the track, indicated in track metadata for the track. The primary storage system sends the track format information to the secondary storage system, in response to determining there is the track format information and mirrors the track to mirror to the secondary storage system. The secondary storage system uses the track format information for the track in the secondary cache when processing a read or write request to the mirrored track.

16 Claims, 15 Drawing Sheets

(52) U.S. Cl.
CPC .......... *G06F 3/0619* (2013.01); *G06F 3/0674* (2013.01); *G06F 11/2089* (2013.01); *G06F 11/1658* (2013.01); *G06F 2212/283* (2013.01); *G06F 2212/286* (2013.01); *G06F 2212/313* (2013.01); *G06F 2212/621* (2013.01)

(58) Field of Classification Search
CPC ............. G06F 11/2089; G06F 11/1658; G06F 11/2056
See application file for complete search history.

(56) References Cited

U.S. PATENT DOCUMENTS

| | | | |
|---|---|---|---|
| 7,444,541 | B2 | 10/2008 | Lubbers et al. |
| 7,603,580 | B2 | 10/2009 | Zohar et al. |
| 7,774,785 | B2 | 8/2010 | Hartung et al. |
| 8,027,952 | B2 | 9/2011 | Kern et al. |
| 8,271,447 | B1 | 9/2012 | Natanzon et al. |
| 8,332,581 | B2 | 12/2012 | Candelaria et al. |
| 8,606,767 | B2 | 12/2013 | Brown et al. |
| 8,635,339 | B2 | 1/2014 | Luna |
| 8,713,261 | B1 | 4/2014 | Aharoni et al. |
| 8,825,973 | B2 | 9/2014 | Ash et al. |
| 8,825,975 | B2 | 9/2014 | Ash et al. |
| 9,104,552 | B1 | 8/2015 | Bolt |
| 9,239,797 | B2 | 1/2016 | Galbraith et al. |
| 9,298,567 | B2 | 3/2016 | Blea et al. |
| 9,317,207 | B2 | 4/2016 | Hu et al. |
| 9,489,389 | B2 | 11/2016 | Patil et al. |
| 10,223,274 | B1 | 3/2019 | Anderson et al. |
| 10,339,053 | B2 | 7/2019 | Mazina et al. |
| 10,379,954 | B2 | 8/2019 | Shu et al. |
| 2004/0267706 | A1 | 12/2004 | Springer, Sr. et al. |
| 2007/0288710 | A1 | 12/2007 | Boyd et al. |
| 2007/0288792 | A1 | 12/2007 | Thorpe et al. |
| 2008/0120482 | A1 | 5/2008 | Jarvis et al. |
| 2008/0126913 | A1 | 5/2008 | Benhanokh et al. |
| 2008/0172572 | A1 | 7/2008 | Beardsley et al. |
| 2008/0250210 | A1 | 10/2008 | Ash et al. |
| 2011/0191522 | A1 | 8/2011 | Condict et al. |
| 2011/0296100 | A1 | 12/2011 | Plank et al. |
| 2012/0079199 | A1 | 3/2012 | Beardsley et al. |
| 2012/0102078 | A1 | 4/2012 | Flick et al. |
| 2013/0124801 | A1 | 5/2013 | Natrajan et al. |
| 2013/0185501 | A1 | 7/2013 | Ash et al. |
| 2014/0115261 | A1 | 4/2014 | Maybee et al. |
| 2014/0325145 | A1 | 10/2014 | Sampathkumar |
| 2015/0012699 | A1 | 1/2015 | Rizzo et al. |
| 2015/0286432 | A1 | 10/2015 | Dain et al. |
| 2015/0363319 | A1 | 12/2015 | Qi et al. |
| 2016/0085460 | A1 | 3/2016 | Chandrashekar |
| 2016/0357648 | A1 | 12/2016 | Keremane et al. |
| 2017/0052822 | A1 | 2/2017 | Ash et al. |
| 2017/0111468 | A1 | 4/2017 | Ash et al. |
| 2017/0124001 | A1 | 5/2017 | Ash et al. |
| 2018/0107572 | A1 | 4/2018 | Khemani et al. |
| 2019/0034302 | A1 | 1/2019 | Anderson et al. |
| 2019/0034303 | A1 | 1/2019 | Anderson et al. |
| 2019/0034304 | A1 | 1/2019 | Anderson et al. |
| 2019/0034355 | A1 | 1/2019 | Anderson et al. |
| 2019/0042096 | A1 | 2/2019 | Anderson et al. |
| 2019/0050339 | A1 | 2/2019 | Anderson et al. |
| 2019/0050340 | A1 | 2/2019 | Anderson et al. |
| 2019/0073279 | A1 | 3/2019 | Anderson et al. |
| 2019/0347173 | A1 | 11/2019 | Anderson et al. |
| 2020/0004649 | A1 | 1/2020 | Anderson et al. |

OTHER PUBLICATIONS

Anonymously; "A Systematic Framework for Managing Data Rules at Scale: For Big Data, The Cloud, and Beyond"; http://ip.com/IPCOM/000242035D; Jun. 15, 2015, pp. 4.
Anonymously; "Record Level Change Tracking Included within a Data Set"; http://ip.com/IPCOM/000239805D; Dec. 2, 2014, pp. 3.
Anonymously; "Optimized Deduplication Metadata Online Redistribution"; http://ip.com/IPCOM/000228925D; Jul. 15, 2013, pp. 8.
U.S. Appl. No. 15/662,194, filed Jul. 27, 2017.
U.S. Appl. No. 15/662,200, filed Jul. 27, 2017.
U.S. Appl. No. 15/672,460, filed Aug. 9, 2017.
U.S. Appl. No. 15/688,763, filed Aug. 28, 2017.
U.S. Appl. No. 15/672,470, filed Aug. 9, 2017.
U.S. Appl. No. 15/694,704, filed Sep. 1, 2017.
U.S. Appl. No. 15/662,186, filed Jul. 27, 2017.
Office Action dated Feb. 6, 2019, pp. 18, for U.S. Appl. No. 15/662,186.
Response dated May 5, 2019, pp. 11, to Office Action dated Feb. 6, 2019, for U.S. Appl. No. 15/662,186.
Notice of Allowance dated Jun. 4, 2019, pp. 17, for U.S. Appl. No. 15/662,186.
Notice of Allowance dated Sep. 13, 2019, pp. 9, for U.S. Appl. No. 15/662,186.
U.S. Appl. No. 16/518,966, filed Jul. 22, 2019.
Preliminary Amendment dated Jul. 22, 2019, pp. 8, for U.S. Appl. No. 16/518,966.
U.S. Appl. No. 15/666,525, filed Aug. 1, 2017.
Office Action dated Apr. 8, 2019, pp. 25, for U.S. Appl. No. 15/666,525.
Response dated Jul. 4, 2019, pp. 11, to Office Action dated Apr. 8, 2019, pp. 25, for U.S. Appl. No. 15/666,525.
Notice of Allowance dated Oct. 9, 2019, pp. 42, for U.S. Appl. No. 15/666,525.
Preliminary Amendment dated 2020-, pp. , for U.S. Appl. No. 15/666,525, filed Aug. 1, 2017.
U.S. Appl. No. 15/662,205, filed Jul. 27, 2017.
Office Action dated Feb. 25, 2019, pp. 24, for U.S. Appl. No. 15/662,205.
Response dated May 21, 2019, pp. 11, to Office Action dated Feb. 25, 2019, pp. 24, for U.S. Appl. No. 15/662,205.
Notice of Allowance dated Jul. 3, 2019, pp. 14, for U.S. Appl. No. 15/662,205.
Notice of Allowance dated Sep. 23, 2019, pp. 9, for U.S. Appl. No. 15/662,205.
U.S. Appl. No. 16/565,376, filed Sep. 9, 2019.
Preliminary Amendment dated Sep. 9, 2019, pp. 8, for U.S. Appl. No. 16/565,376, filed Sep. 9, 2019.
Final Office Action dated Mar. 17, 2021, pp. 14, for U.S. Appl. No. 16/565,376.
Response to Office Action, dated Dec. 2, 2020, for U.S. Appl. No. 16/565,376, Total 11 pages.
Office Action dated Feb. 10, 2021, pp. 40, for U.S. Appl. No. 16/518,966.
Response dated Apr. 12, 2021, p. 11, to Office Action dated Feb. 10, 2021, p. 40, for U.S. Appl. No. 16/518,966.
Response dated May 7, 2021, p. 8, to Final Office Action dated Mar. 17, 2021, for U.S. Appl. No. 16/565,376.
Notice of Allowance dated Jun. 16, 2021, p. 16, for U.S. Appl. No. 16/565,376.
Final Office Action dated Jun. 30, 2021, p. 25, for U.S. Appl. No. 16/518,966.
Response dated Aug. 30, 2021, p. 11, to Final Office Action dated Jun. 30, 2021, p. 25, for U.S. Appl. No. 16/518,966.
Notice of Allowance dated Sep. 15, 2021, p. 10, for U.S. Appl. No. 16/518,966.

Track Format Table Entry

Cache Control Block

Cache LRU List

Demoted Cache LRU List

Demoted Cache Control Block

Demoted Cache Control Block Directory Entry

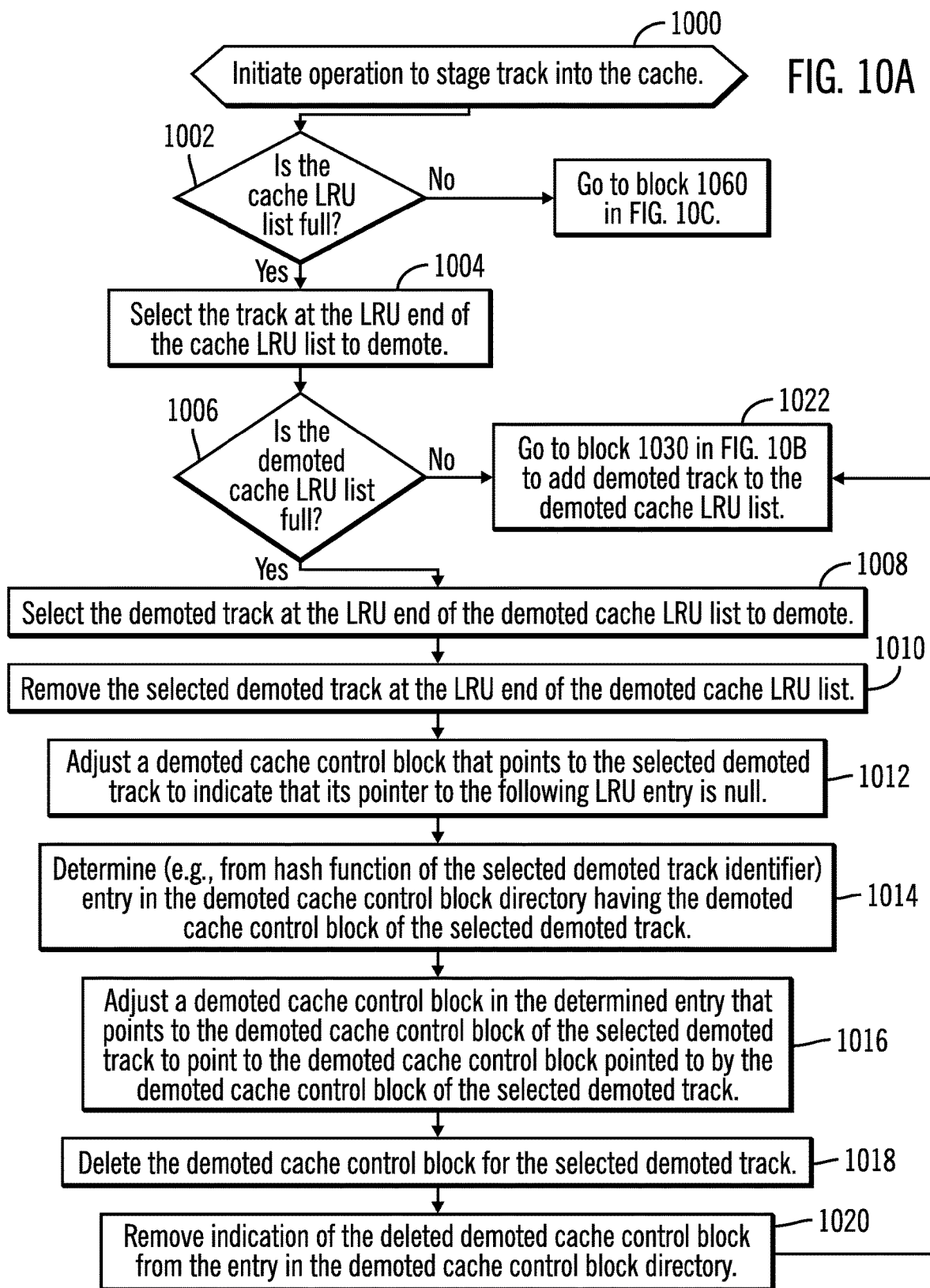

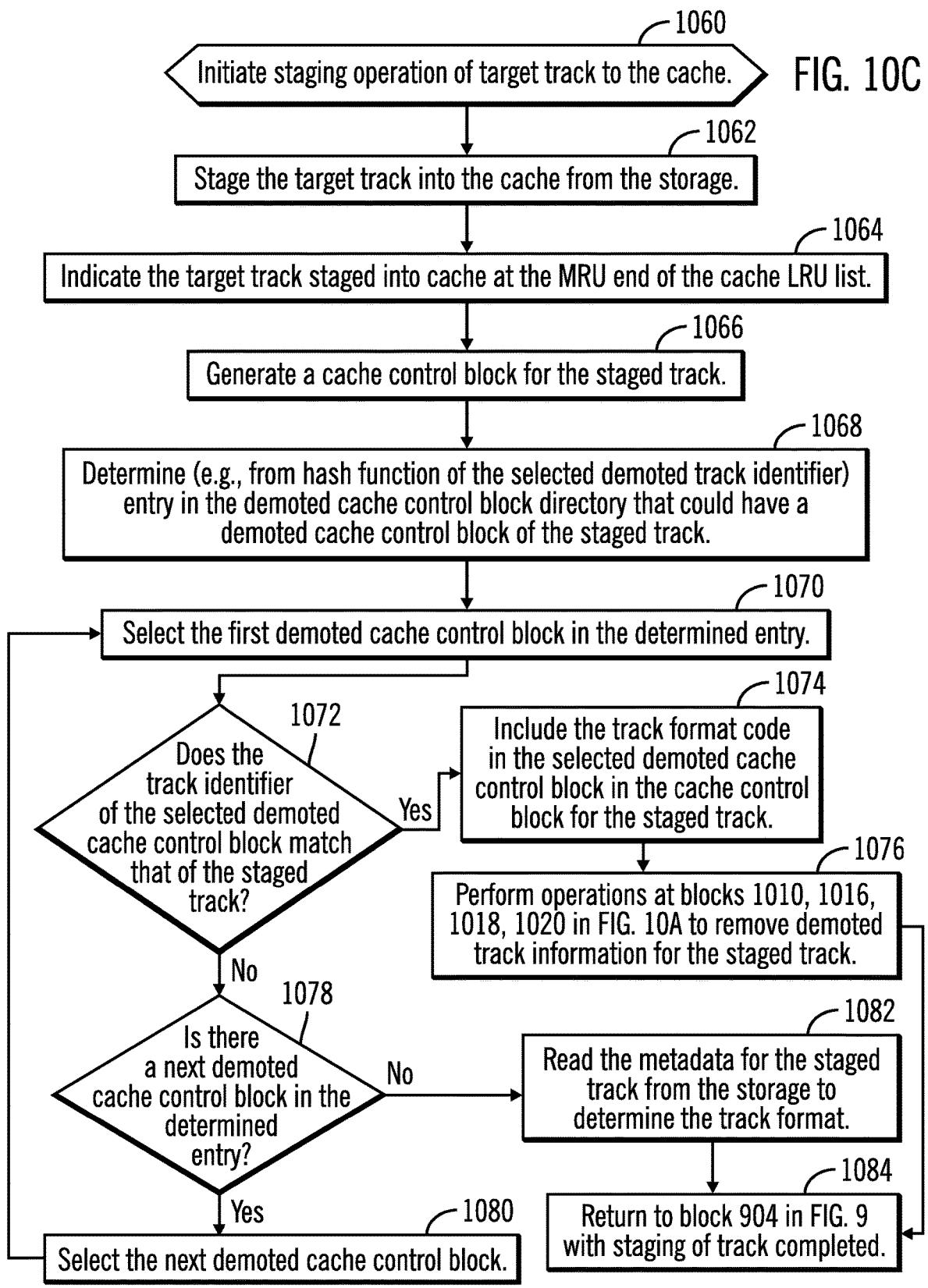

PROVIDING TRACK FORMAT INFORMATION WHEN MIRRORING UPDATED TRACKS FROM A PRIMARY STORAGE SYSTEM TO A SECONDARY STORAGE SYSTEM

BACKGROUND OF THE INVENTION

1. Field of the Invention

Provided are a computer program product, system, and method providing track format information when mirroring updated tracks from a primary storage system to a secondary storage system.

2. Description of the Related Art

In a storage environment, a host system may communicate a read/write request to a connected storage system over network channel through a network adaptor. If the data is in a cache of the storage system, i.e., a read hit, then the data may be returned quickly to the host system. This reduces the delay in returning requested data to a host I/O request. However, if the requested data is not in the cache of the storage system, then there may be significant latency realized while the storage system needs to retrieve the requested data from storage to return. Further, the thread or task executing the host read request may have to be context switched and deactivated in order to allow the host system to process further I/O requests. When the data is returned to the read request, then the task must be reactivated and data for the task must be returned to registers and processor cache to allow processing of the returned data for the read request.

In a data mirroring storage environment, a primary storage system mirrors data to a secondary storage system to provide a backup copy of the data in the event of a failure at the primary storage system, so that access can continue at the secondary storage system.

There is a need in the art for improved techniques for processing host read/write requests to the cache in a mirrored storage environment in which data is being mirrored between a primary and secondary storage systems.

SUMMARY

Provided are a computer program product, system, and method for providing track format information when mirroring updated tracks from a primary storage system to a secondary storage system. The primary storage system determines a track to mirror to the secondary storage system and determines whether there is track format information for the track to mirror that the primary storage system maintains for caching the track to mirror in the primary cache. The track format information indicates a format and layout of data in the track, indicated in track metadata for the track. The primary storage system sends the track format information to the secondary storage system, in response to determining there is the track format information and mirrors the track to mirror to the secondary storage system. The secondary storage system uses the track format information for the track in the secondary cache when processing a read or write request to the mirrored track.

BRIEF DESCRIPTION OF THE DRAWINGS

FIGS. 10a, 10b, and 10c illustrate an embodiment of operations to stage a track into the cache.

DETAILED DESCRIPTION

Figure 1:
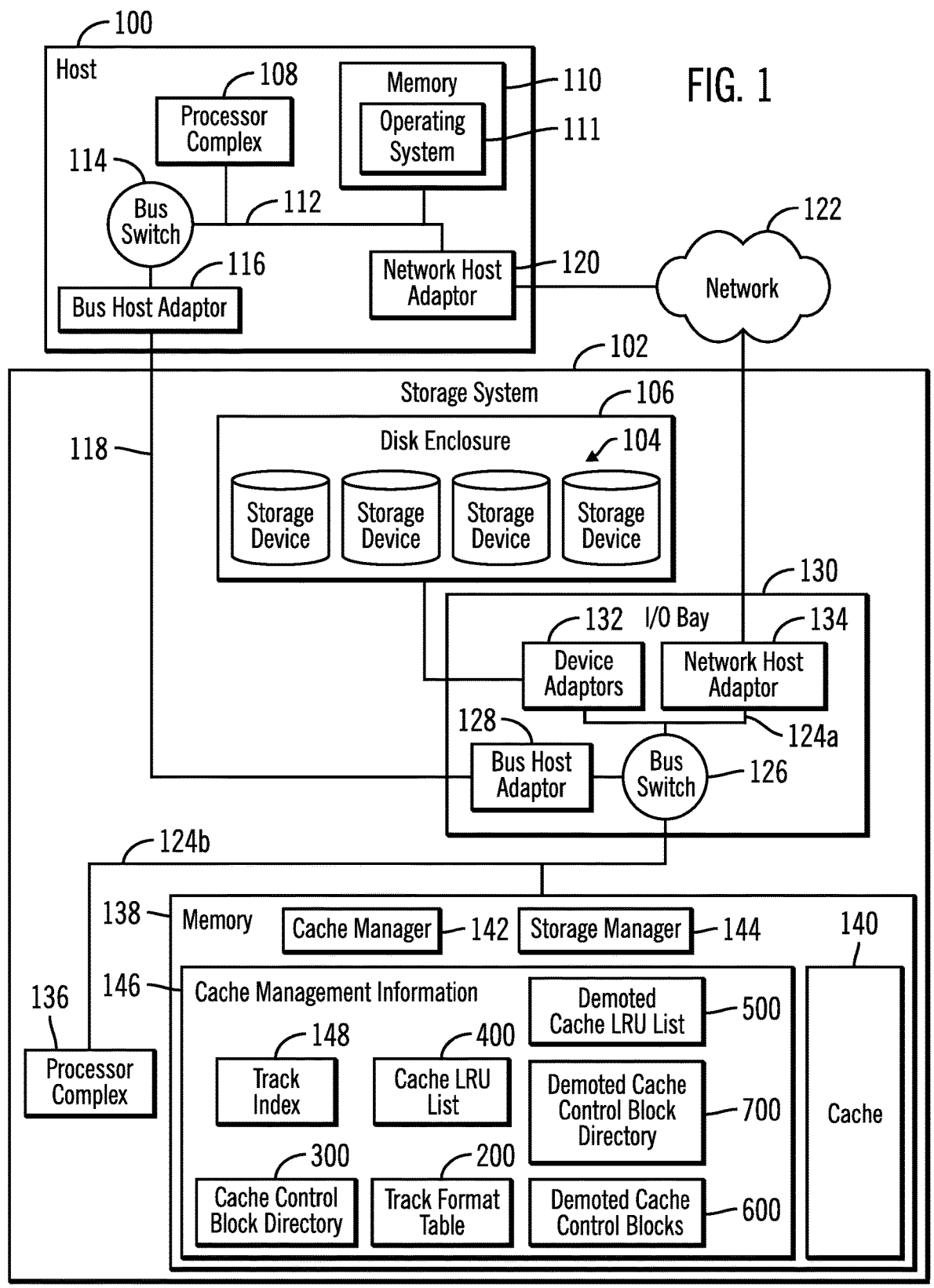
FIG. 1 illustrates an embodiment of a storage environment.

In a storage environment, a host system may first communicate a read/write request to a connected storage system over a fast channel, such as a bus interface, such as the Peripheral Component Interconnect Express (PCIe) interface. For a read/write request over the fast channel which is supposed to complete within a threshold time, the host system holds the application thread for the read/write request in a spin loop waiting for the request to complete. This saves processor time associated with a context swap, which deactivates the thread and reactivates the thread in response to an interrupt when a response to the read/write request is received. If the data for the read/write request sent on the fast channel is not in cache, then the storage system may fail the read/write request and the host system may communicate the same read/write request over a storage area network via a host adaptor, which is slower than processing the I/O request over the bus, e.g., PCIe interface. Communicating the read/write request over the second channel requires the host system to perform context switch from the task handling the read/write request to another task while waiting for the read/write request to complete. Context switching is costly because it requires the processor running the task to clear all registers and L1 and L2 caches for the new task, and then when completing the new task, reactivate the context switched task and return the state data to the registers and L1 and L2 caches for the task that was context switched while waiting for the read/write request to complete.

Certain read/write operations need to be completed within a threshold time, else they are failed. The storage system will have to access track metadata to process a request to a track. The track metadata provides information on the format of data and layout of records in the track that are needed in order to perform reads and writes to the track. However, the reading of the track metadata from the storage comprises a substantial portion of the latency in processing read/write request. Described embodiments provide improvements to cache technology that reduce cache operation latency by including a track format code in the cache control block for a track in the cache. This track format code may be used for fast access to the track format from a track format table without having to read the track metadata from storage. By eliminating the need to read the track metadata from a metadata track in storage to determine the track layout, described embodiments increase the likelihood that read/write requests on the first channel that need to be completed within a threshold time are completed by accessing the track layout information for a track from the track format table, associating track format codes with track format information for common track formats.

Described embodiments provide further improvements to cache computer technology by reducing cache latency for a track staged into cache that was previously demoted by saving track format metadata, such as the track format code, when a track is demoted from the cache. When the demoted track is later staged into cache, the track format metadata may be quickly determined by the track format information saved with the demoted track and included in a cache control block for the staged track without having to read the metadata for the staged track. Avoiding the need to read the track metadata for a staged track substantially reduces the latency and delays in staging a track and processing a read/write request to the staged track.

With described embodiments, a read/write request to a target track on a channel requiring that the request be completed within a threshold time is processed if the track format code for the target track is within the cache control block for the target track. Using the track format code to access the track format metadata from the track format table reduces the latency of access to the track format metadata to allow the read/write request to complete within the time threshold. This keeps the time the host thread is spinning on the read/write request task for the read/write request sent on the bus interface within an acceptable time threshold. However, if the cache control block for the target track does not have a valid track format code, then the read/write request on the first channel is failed because it is unlikely the read/write request can complete within the threshold time given that the track format metadata will have to be retrieved from the storage. Failing the read/write request on the first channel, causes the host to redrive the read/write request on the second channel. The processing of the read/write request on the second channel reads in the track metadata from the storage to allow for processing the read/write request and adding the track format code to the cache control block for the target track.

In a mirror copy storage environment, the primary storage system mirrors updated tracks at the primary storage system to the secondary storage system. In the prior art when mirroring data, the secondary storage system would have to read and access track metadata from a secondary storage to determine the track format and layout, which introduces latency when processing I/O requests to updated tracks in a secondary cache at the secondary storage system. Described embodiments reduce the latency of I/O requests redirected to a secondary storage system after updated tracks are mirrored by having the primary storage system mirroring data transfer track format information of tracks in the cache at the primary storage system as part of the mirroring. The secondary system may maintain this transferred track format information for tracks in its cache, such as track format codes, to use for subsequent I/O requests to the tracks after the failover. In this way, when subsequent requests are received after failover to the secondary storage system, the secondary storage system may use the track format information transferred over from the primary storage system to determine the track format and layout without having to read track metadata from the storage at the secondary storage system. This substantially reduces latency in processing I/O requests to mirrored updated tracks at the secondary storage system because the secondary storage system may avoid accessing and reading the track metadata from the secondary storage. Further, because the track format information is transferred for those tracks that were updated in the cache of the primary storage, if there is a failover from the primary storage system to the secondary storage system, there is a high probability that there will be further requests to those tracks in the cache at the secondary storage system after the failover. This means that the latency reduction benefits of transferring the track format information will likely be realized at the secondary storage system for multiple I/O requests in the event of a failover.

FIG. 1 illustrates an embodiment of a storage environment in which a host 100 directs read and write requests to a storage system 102 to access tracks in volumes configured in storage devices 104 in a disk enclosure 106. The host 100 includes a processor complex 108 of one or more processor devices and a memory 110 including an operating system 111 executed by the processor complex 108. The host operating system 111 generates read and write requests to tracks configured in the storage devices 104. The host 100 includes hardware to communicate read and write requests on two different channels. A first channel is a bus interface, such as a Peripheral Component Interconnect Express (PCIe), including a bus 112, a bus switch 114 to connect one or more devices on the bus 112, including the processor complex 108, a memory system 110, and a bus host adaptor 116 to extend the bus interface over an external bus interface cable 118 to the storage system 102. Additional bus interface technology to extend the bus interface may be utilized, including PCIe extender cables or components, such as a distributed PCIe switch, to allow PCIe over Ethernet, such as with the ExpEther technology. A second channel to connect the host 100 and storage system 102 uses a network host adaptor 120, connected to the bus 112, that connects to a separate network 122 over which the host 100 and storage system 102 additionally communicate. The first channel through the bus interface may comprise a faster access channel than the network 122 interface through the network host adaptor 120.

The storage system 102 includes a bus interface comprising a bus 124a, 124b, a bus switch 126 to connect to endpoint devices on the bus 124a, 124b, and a bus host adaptor 128 to connect to the external bus interface cable 118 to allow communication over the bus interface to the host 100 over the first channel. The storage system 102 includes an Input/Output bay 130 having the bus host adaptor 128, one or more device adaptors 132 to connect to the storage devices 104, and one or more network host adaptors 134 to connect to the network 122 and host systems.

The storage system 102 includes a processor complex 136 of one or more processor devices and a memory 138 having a cache 140 to cache tracks accessed by the connected hosts 100. The memory 138 includes a cache manager 142 and a storage manager 144. The storage manager 144 manages access requests from processes in the hosts 100 and storage system 102 for tracks in the storage 104. The devices 136, 138, 128, 132, and 134 connect over the bus interface implemented in the bus lanes 124a, 124b and bus switch 126.

The cache manager 142 maintains accessed tracks in the cache 140 for future read access to the tracks to allow the accessed tracks to be returned from the faster access cache 140 instead of having to retrieve from the storage 104. Further, tracks in the cache 140 may be updated by writes. A track may comprise any unit of data configured in the storage 104, such as a track, Logical Block Address (LBA), etc., which is part of a larger grouping of tracks, such as a volume, logical device, etc.

The cache manager 142 maintains cache management information 146 in the memory 138 to manage read (unmodified) and write (modified) tracks in the cache 140. The cache management information 146 may include a track format table 200 having track format codes for common track format descriptors providing details of a layout and format of data in a track; track index 148 providing an index of tracks in the cache 140 to cache control blocks in a control block directory 300; and a Least Recently Used (LRU) list 400 for tracks in the cache 140. The control block directory 300 includes the cache control blocks, where there is one cache control block for each track in the cache 140 providing metadata on the track in the cache 140. The track index 148 associates tracks with the cache control blocks providing information on the tracks in the cache 140. Upon determining that the cache LRU list 400 is full or has reached a threshold level, tracks are demoted from the LRU list 400 to make room for more tracks to stage into the cache 140 from the storage 104.

In certain embodiments, there may be multiple hosts 100 that connect to the storage system 102 over the first and second channels to access tracks in the storage devices 104. In such case, the storage system 102 would have at least one bus host adaptor 128 to connect to the bus interface 118 of each connected host 100 and one or more network host adaptors 134 to connect to the network host adaptors 120 on the hosts 100.

In one embodiment, the bus interfaces 112, 114, 116, 118, 124a, 124b, 126, and 128 may comprise a Peripheral Component Interconnect Express (PCIe) bus interface technology. In alternative embodiments, the bus interfaces 112, 114, 116, 118, 124a, 124b, 126, and 128 may utilize suitable bus interface technology other than PCIe. The bus host adaptors 116 and 128 may comprise PCIe host adaptors that provide the interface to connect to the PCIe cable 118. The network 122 may comprise a Storage Area Network (SAN), a Local Area Network (LAN), a Wide Area Network (WAN), the Internet, an Intranet, etc., and the network host adaptors 120, 134 provide the network 122 connections between the hosts 100 and storage system 102.

The storage system 102 may comprise a storage system, such as the International Business Machines Corporation (IBM®) DS8000® and DS8880 storage systems, or storage controllers and storage systems from other vendors. (IBM and DS8000 are trademarks of International Business Machines Corporation throughout the world). The host operating system 111 may comprise an operating system such as Z Systems Operating System (Z/OS®) from International Business Machines Corporation ("IBM") or other operating systems known in the art. (Z/OS is a registered trademark of IBM throughout the world).

The storage devices 104 in the disk enclosure 106 may comprise different types or classes of storage devices, such as magnetic hard disk drives, solid state storage device (SSD) comprised of solid state electronics, EEPROM (Electrically Erasable Programmable Read-Only Memory), flash memory, flash disk, Random Access Memory (RAM) drive, storage-class memory (SCM), etc., Phase Change Memory (PCM), resistive random access memory (RRAM), spin transfer torque memory (STT-RAM), conductive bridging RAM (CBRAM), magnetic hard disk drive, optical disk, tape, etc. Volumes in a storage space may further be configured from an array of devices, such as Just a Bunch of Disks (JBOD), Direct Access Storage Device (DASD), Redundant Array of Independent Disks (RAID) array, virtualization device, etc. Further, the storage devices 104 in the disk enclosure 106 may comprise heterogeneous storage devices from different vendors and different types of storage devices, such as a first type of storage devices, e.g., hard disk drives, that have a slower data transfer rate than a second type of storage devices, e.g., SSDs.

Figure 2:
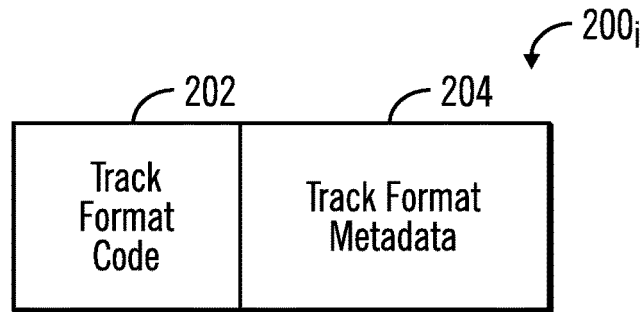
FIG. 2 illustrates an embodiment of a track format table entry.

FIG. 2 illustrates an embodiment of a track format table entry $200_i$, in the track format table 200, which includes a track format code 202 and the track format metadata 204. In certain embodiments Count Key Data (CKD) track embodiments, the track format metadata 204 may comprise a track format descriptor (TFD) indicating a number of records in the track, a block size, a number of blocks in the track, a data length of each of the records, and a control interval size indicating an amount of data that is read or written atomically as a unit, number of blocks in a control interval, and whether a control interval spans two tracks, and other information. The track format code 202 may comprise an index value of the index entry $200_i$ in the track format table 200. For instance, if there are 32 track format table entries $200_i$, then the track format code 202 may comprise 5 bits to reference the different possible number of 32 entries $200_i$.

Figure 3:
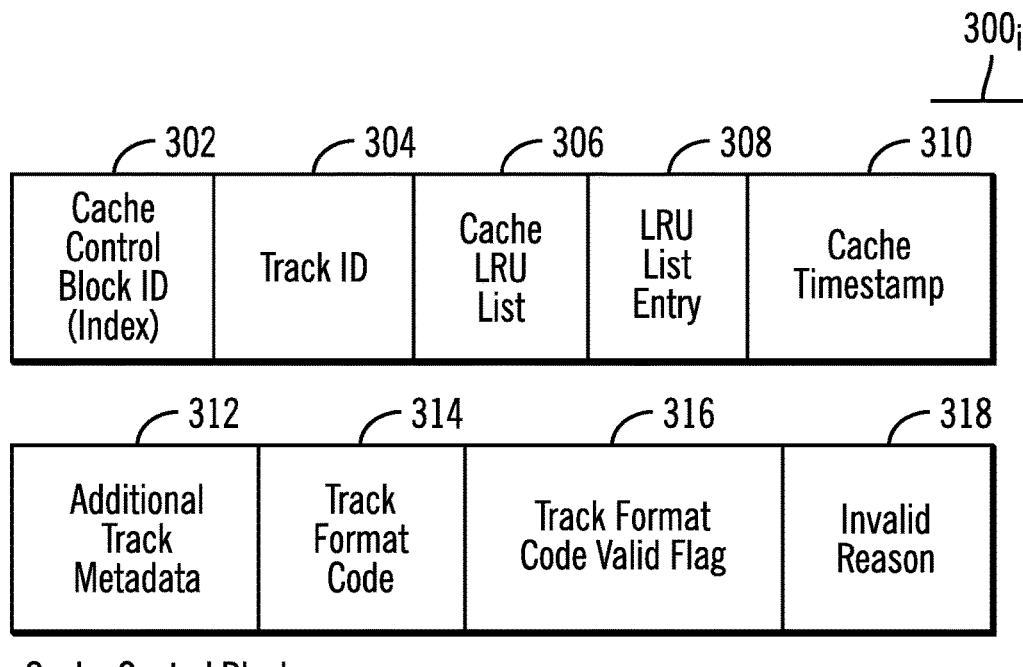
FIG. 3 illustrates an embodiment of a cache control block.

FIG. 3 illustrates an embodiment of a cache control block $300_i$ for one of the tracks in the cache 140, including, but not limited to, a cache control block identifier 302, such as an index value of the cache control block $300_i$; a track ID 304 of the track in the storage 104; the cache LRU list 306 in which the cache control block $300_i$ is indicated; an LRU list entry 308 at which the track is indicated; a cache timestamp 310 indicating a time the track was added to the cache 140 and indicated on the LRU list 306; additional track metadata 312 typically maintained for tracks stored in the cache 140, such as a dirty flag indicating whether the track was modified; a track format code 314 comprising one of the track format codes 202 of the track format metadata 204 describing the layout of data in the track 304 represented by the cache control block $300_i$; a track format code valid flag 316 indicating whether the track format code 314 is valid or invalid; and an invalid reason 318 indicating a reason for the track format code valid flag 316 code being invalid, as indicated in the track format code valid flag 316.

Figure 4:
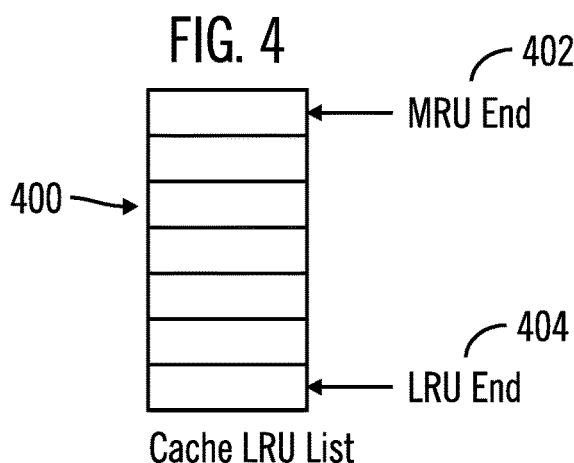
FIG. 4 illustrates an embodiment of a cache Least Recently Used (LRU) list of tracks in the cache.

FIG. 4 illustrates an embodiment of an LRU list 400, such as having a most recently used (MRU) end 402 identifying a track most recently added to the cache 140 or most recently accessed in the cache 140 and a least recently used (LRU) end 404 from which the track identified at the LRU end 404 is selected to demote from the cache 140. The MRU end 402 and LRU end 404 point to track identifiers, such as a track identifier address or a cache control block index for the track, of the tracks that have been most recently added and in the cache 140 the longest, respectively, for tracks indicated in that list 400.

Figure 5:
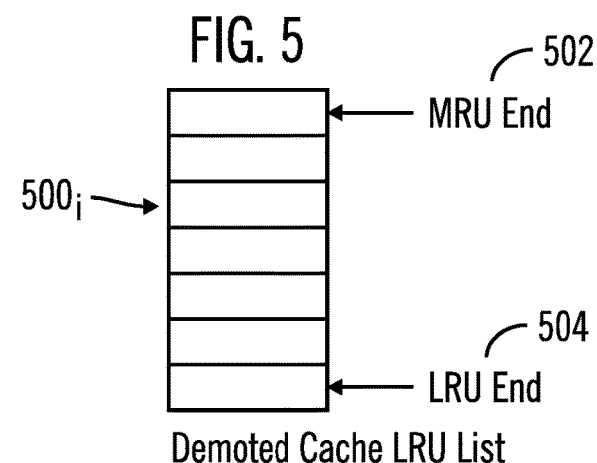
FIG. 5 illustrates an embodiment of a demoted cache Least Recently Used (LRU) list of tracks demoted from the cache.

FIG. 5 illustrates an embodiment of the demoted cache LRU list 500, having a most recently used (MRU) end 502 identifying a demoted track most recently added to the demoted cache LRU list 500 and a least recently used (LRU) end 504 from which the demoted track identified at the LRU end 504 is selected to demote from the demoted cache LRU list 500.

Figure 6:
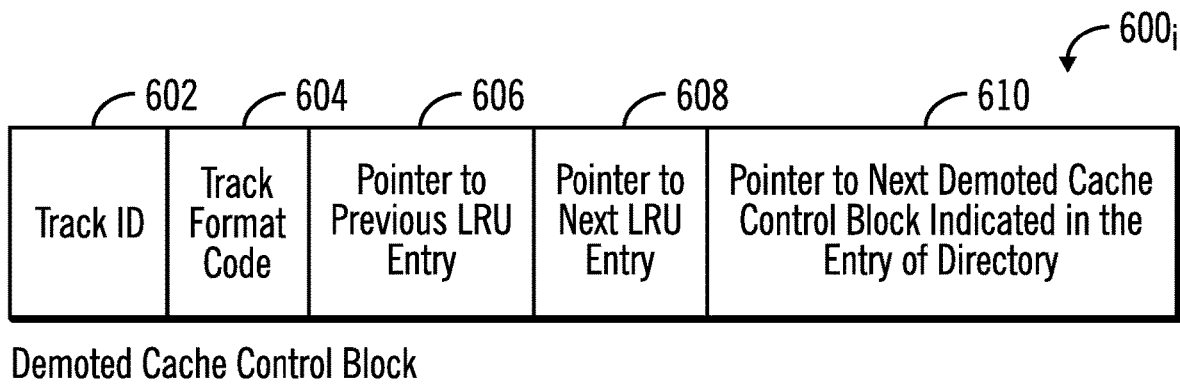
FIG. 6 illustrates an embodiment of a demoted cache control block.

FIG. 6 illustrates an embodiment of a demoted cache control block $600_i$, having a track identifier (ID) 602 of a demoted track; a track format code 604 if available of the track format metadata 204 in the track format table 200 of the demoted track; a pointer to a previous LRU entry 606 of a previous demoted track in the demoted cache LRU list 500; a pointer to a next LRU entry 608 of a next demoted track in the demoted cache LRU list 500; and a pointer 610 to next demoted cache control block in the entry in the demoted cache control block directory 700 for the track ID 602.

In additional embodiments, the track format code 604 may comprise track format information other than a code 604 in a track format table 200, such as other information that may be used to identify or represent the track format metadata and layout of data in the tracks and comprises substantially less bits of information than the represented track format metadata and layout information.

Figure 7:
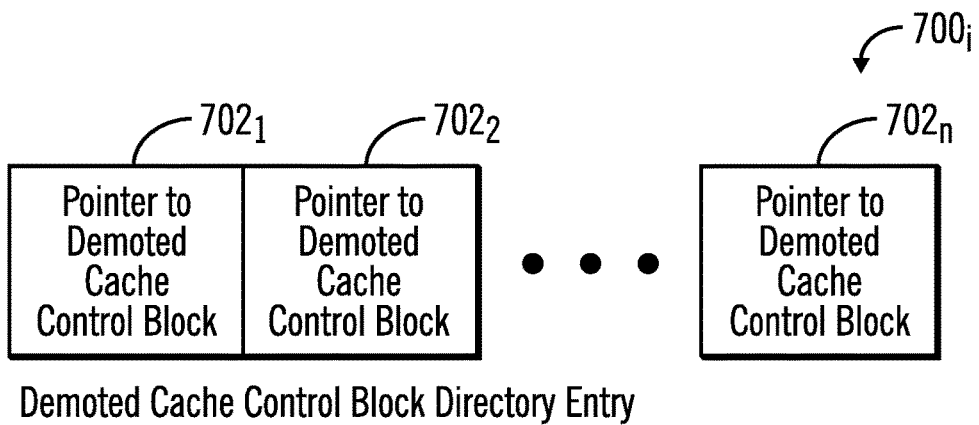
FIG. 7 illustrates an embodiment of a demoted cache control block directory entry.

FIG. 7 illustrates an embodiment of an entry $700_i$ in the demoted cache control block directory 700 that includes pointers $702_1, 702_2 \ldots 702_n$ to demoted cache control blocks $600_i$. Each demoted cache control block $600_i$ maps to one entry in the demoted cache control block directory 700 based on the track ID 602. In one embodiment, a hash function of the track identifier would produce the entry in the demoted cache control block directory 700 in which the demoted cache control block $600_i$ is indicated.

Figure 8:
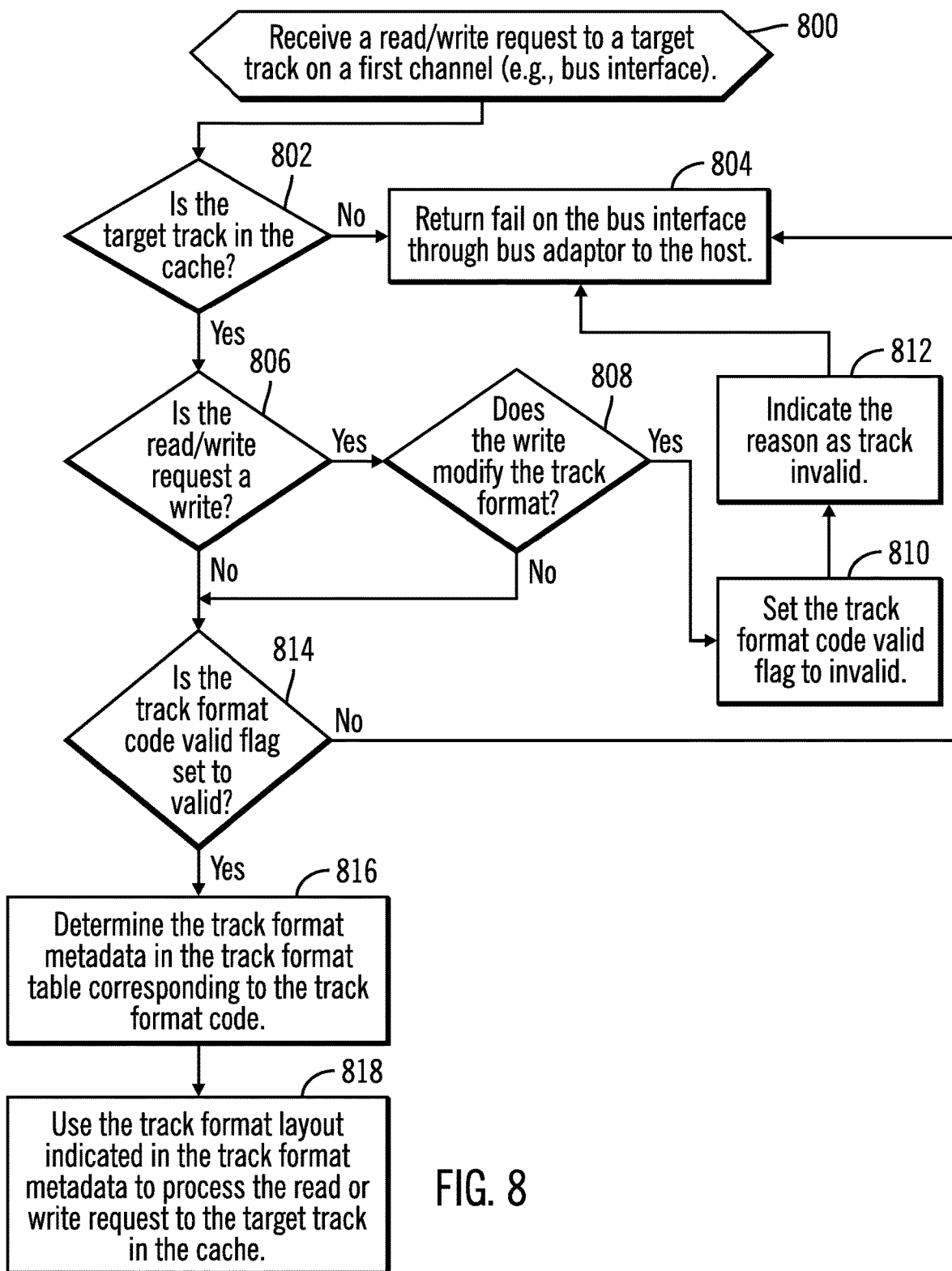
FIG. 8 illustrates an embodiment of operations to process a read/write request received on a first channel, such as a bus interface.

FIG. 8 illustrates an embodiment of operations performed by the cache manager 142 and storage manager 144 to process a read/write request to a target track received on a first fast channel, such as the PCIe bus interface via bus host adaptor 128. Upon receiving (at block 800) the read/write request at the bus host adaptor 128, if (at block 802) the target track is not in the cache 140, then the storage manager 144 returns (at block 804) fail to the read/write request on the first channel or bus host adaptor 128 to the host 100, which causes the host 100 to retry the read/write request on the second channel or network host adaptor 120, 134. Failure is returned because if the target track is not in the cache 140, then the target track and track metadata needs to be staged into cache 140, which would likely exceed the time threshold for read/writes on the first channel, where the host processor is spinning on the thread of the read/write request. If (at block 802) the target track is in the cache 140 is a write and if (at block 808) the write modifies the track format, then the cache manager 142 sets (at block 810) the track format code valid flag 316 to invalid and indicates (at block 812) the invalid reason 318 that the track in the cache 140 was invalidated as track format change. The storage manager 144 then returns (at block 804) fail to the host 100 because the track metadata needs to be read from the storage 104 to update with the modified track format.

If (at block 806) the read/write request is a read or if (at block 808) the request is a write that does not modify the track format, then the cache manager 142 determines (at block 814) if the track format code valid flag 316 is set to valid. If so, then the cache manager 142 determines (at block 816) the track format metadata 204 in the track format table 200 corresponding to the track format code 314 in the cache control block $300_i$. The cache manager 142 uses (at block 818) the track format layout indicated in the determined track format metadata 204 to process the read or write request to the target track in the cache 140. If the request is a write, a dirty flag 312 in the cache control block $300_i$ may be set to indicate the track is modified. If (at block 814) the track format code valid flag 316 is invalid, meaning there is no fast access to track format information available through the track format code 314, then the storage manager 144 returns (at block 804) fail on the bus interface to the bus host adaptor 128 because the track format table 200 cannot be used, and the track metadata needs to be read from the storage 104, which would introduce too much latency for the fast read/write on the first channel.

With the embodiment of operations of FIG. 8, during a fast write over the bus interface or first channel, if the track format metadata may be accessed without latency through the track format table 200, then the read/write request is allowed to proceed when the transaction can be processed very quickly because the track metadata can be obtained directly from the track format table 200 through the track format code 314, without having to read the track metadata from storage 104. However, if the cache control block $300_i$ does not have a valid track format code 314 to allow low latency access of track format metadata, then the read/write request is failed because the transaction will not likely complete within a fast time threshold. This determination is important to avoid host delays in processing other tasks while the host processor is spinning on the thread handling the read/write request while waiting for the read/write request to complete. If the track metadata can be accessed from the track format table 200 than there is a high likelihood the read/write can complete on the bus interface channel within the time required to avoid the host processor holding the thread for too long, which causes other I/O requests to be queued and delayed. If the track metadata cannot be accessed from the track format table 200 and needs to be read from the storage 104, then it is unlikely the read/write request will complete within the time threshold for the host processor to spin on the thread for the read/write request, and failure is returned. Returning failure when the track metadata cannot be obtained from the track format table 200 causes the host thread waiting on the read/write request task to be deactivated and the host processor may context switch to processing other tasks, and then the read/write request is retried on the second network channel during the context switch.

Figure 9:
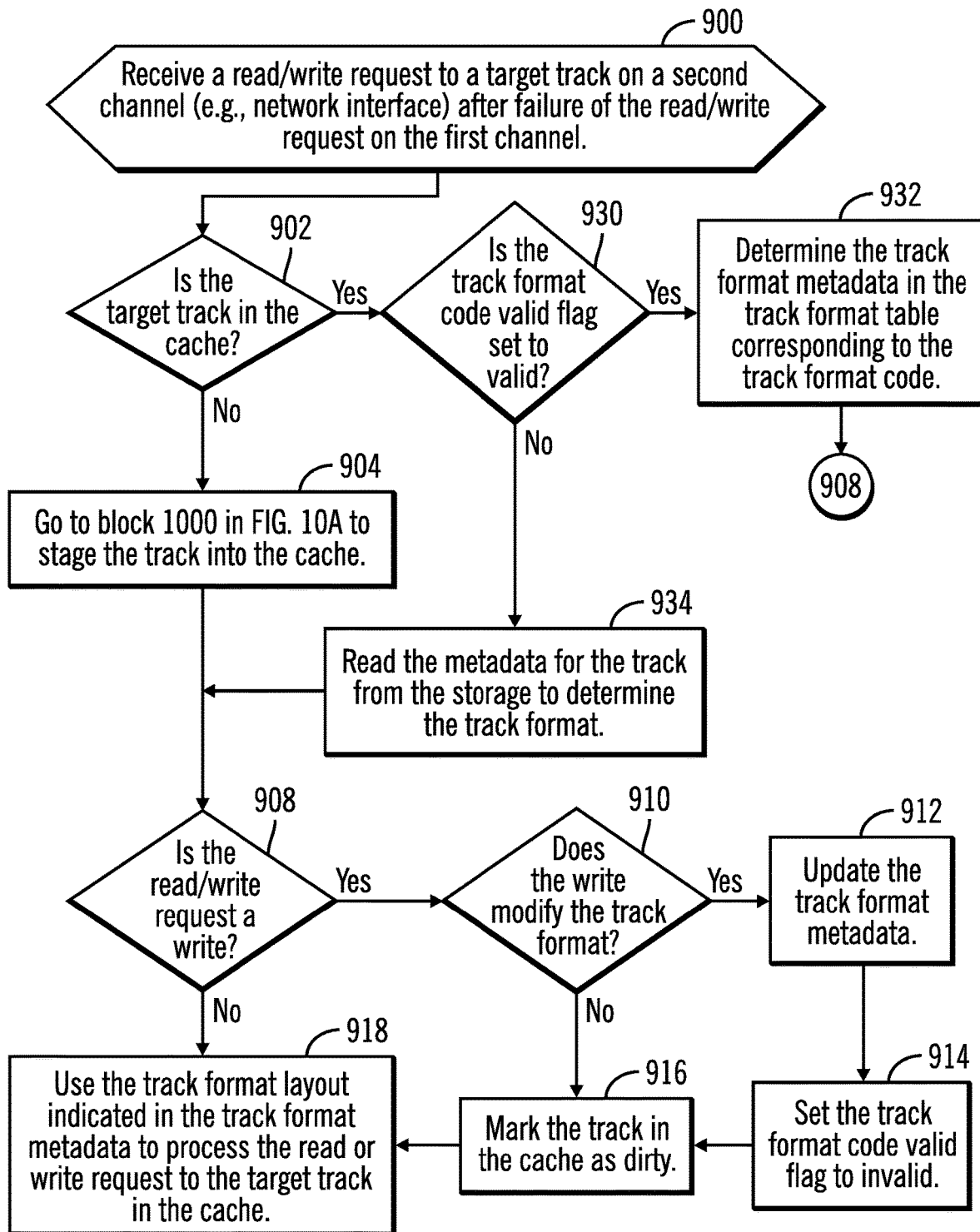
FIG. 9 illustrates receive an embodiment of operations to process a read/write request received on a second channel, such as a network.

FIG. 9 illustrates an embodiment of operations performed by the cache manager 142 and storage manager 144 to process a read/write request to a target track received on a second channel, such as the network 122 on network host adaptor 134. Upon receiving (at block 900) the read/write request, if (at block 902) the target track is not in the cache 140, then the cache manager 142 proceeds (at block 904) to block 1000 in FIG. 10a to stage the track into the cache 140.

If (at block 908) the read/write request is a write and if (at block 910) the write modifies the track format, then the cache manager 142 updates (at block 912) the track metadata to indicate the modified track format and sets (at block 914) the track format code valid flag 316 to invalid. The track metadata 312 is further updated (at block 916) to indicate the track is modified or dirty. If (at block 908) the request is a read or from block 916, the cache manager 142 uses (at block 918) the track format layout indicated in the track format metadata to process the read or write request to the target track in the cache 140.

If (at block 902) the target track is in the cache 140 and if (at block 930) the track format code valid flag 316 is set to valid, then the cache manager 142 determines (at block 932) the track format metadata 204 in the track format table 200 corresponding to the track format code 314 in the cache control block $300_i$ for the target track. From block 932, control proceeds to block 908 to process the read/write request. If (at block 930) the track format code valid flag 316 is set to invalid, then the cache manager 142 reads (at block 934) the track metadata for the target track from the storage 104 to determine the track format, e.g., size of blocks, control interval, layout of records on the track, etc. From block 934, control proceeds to block 908 to process the read/write request.

With the embodiment of FIG. 9, when the read/write request is received on the second slower channel, such as over the network 122, where the host operating system 111 would have performed a context switch for the thread handling the read/write request, the cache manager 142 may read the track metadata from the storage 104 to determine the track layout to process the request. During this time, the host processing of further host requests is not delayed because the host thread handling the read/write request is context switched and not active, until the read/write request returns complete.

Figure 10B:
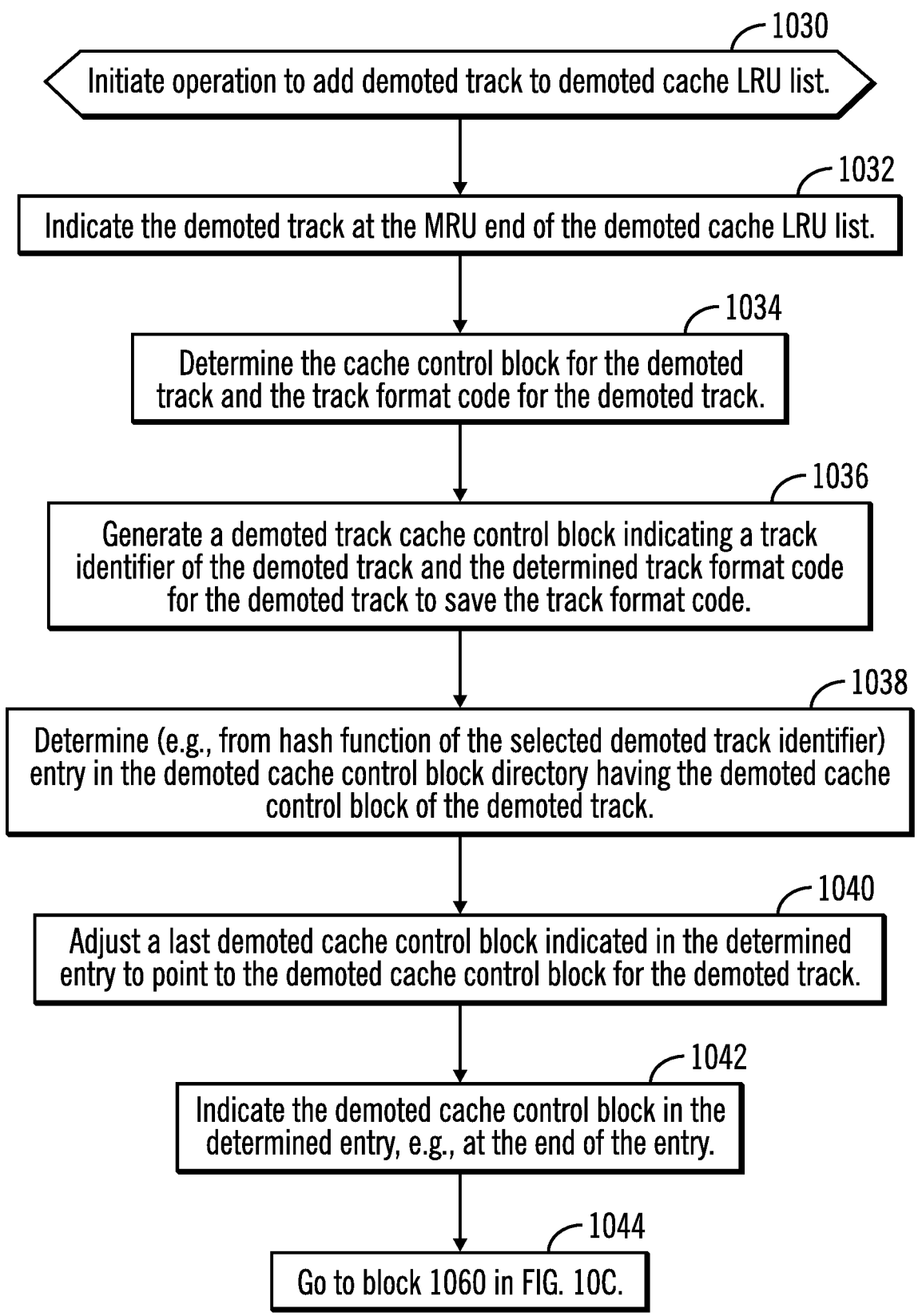

FIGS. 10a, 10b, and 10c illustrate an embodiment of operations performed by the cache manager 142 to stage a track into the cache 140, which may be invoked at block 904 in FIG. 9 when the target track of a read/write request is not in the cache 140. Upon initiating (at block 1000) the operation to stage a track into the cache 140, if (at block 1002) the cache LRU list 400 is full, then the track at the LRU end 404 of the cache LRU list 400 is selected (at block 1004) to demote. If (at block 1006) the demoted cache LRU list 500 is full, then the cache manager 142 selects (at block 1008) a demoted track indicated at the LRU end 504 of the demoted cache LRU list 500 to demote. The selected demoted track is removed (at block 1010) from the LRU end 504. The cache manager 142 adjusts (at block 1012) a demoted cache control block $600_j$ whose pointer to next LRU entry 608 points to the selected demoted track in the demoted cache LRU list 500 to indicate that the pointer 608 is null, because now that entry is at the LRU end 504 when the selected demoted track is removed from the demoted cache LRU list 500.

The cache manager 142 determines (at block 1014) an entry $700_i$ in the demoted cache control block directory 700 having the demoted cache control block $600_S$ of the selected demoted track. In one embodiment, the entry $700_i$ may be determined by applying a hash function to the selected demoted track identifier. The hash function may map any of the track identifiers in the storage 104 to one of the entries $700_i$ in the demoted cache control block directory 700. The cache manager 142 then needs to adjust the pointer 610 that points to the demoted cache control block $600_S$ of the selected demoted track. For this, the cache manager 142 adjusts (at block 1016) a demoted cache control block $600_j$ in the determined entry $700_i$ that points to the demoted cache control block $600_S$ of the selected demoted track to point to the demoted cache control block $600_k$ pointed to by the pointer 610 of the demoted cache control block $600_S$ of the selected demoted track. The demoted cache control block $600_S$ for the selected demoted track is deleted (at block 1018) and indication of the deleted demoted cache control block $600_S$ is removed (at block 1020) from the entry $700_i$ in the demoted cache control block directory 700.

From block 1020 or if (at block 1006) the demoted cache LRU list 500 is not full, control proceeds (at block 1022) to block 1030 in FIG. 10b to add the demoted track from the cache 140 to the demoted cache LRU list 500. Upon initiating (at block 1030) the operation to add the demoted track to the demoted cache LRU list 500, the cache manager 142 indicates (at block 1032) the demoted track at the MRU end 502 of the demoted cache LRU list 500. The cache manager 142 determines (at block 1034) the cache control block $300_{DT}$ for the demoted track from the cache 140 and the track format code 314 for the demoted track if one is included. The cache manager 142 generates (at block 1036) a demoted track cache control block $600_{DT}$ for the track being demoted indicating a track identifier 602 of the demoted track and the determined track format code 314 for the demoted track to save the track format code in field 604 of the demoted track cache control block $600_{DT}$. If there was no valid track format code 314 in the cache control block $300_{DT}$, then a null value may be indicated in the field 604 indicating there is no valid track format code for the demoted track.

The cache manager 142 determines (at block 1038) the entry $700_i$ in the demoted cache control block directory 700 that will be used to indicate the demoted cache control block $600_{DT}$ of the demoted track. The next pointer 610 of the last demoted cache control block $600_i$ indicated in the determined entry $700_i$ is adjusted (at block 1040) to point to the demoted cache control block $600_{DT}$ for the track being demoted. The demoted track control block $600_{DT}$ for the demoted track is indicated (at block 1042) in the determined entry $700_i$ in the demoted cache control block directory 700, e.g., at the end of the entry $700_i$. After adding the demoted track to the demoted LRU list 500 and the demoted cache control block $600_{DT}$ to the demoted cache control block directory 700, control proceeds (at block 1044) to block 1060 in FIG. 10c to stage the target track to the cache 140. Control also proceeds to block 1060 in FIG. 10c to stage the track if (at block 1002 in FIG. 10a) the cache LRU list 400 is not full, so that a track does not need to be demoted from the cache 140 and added to the demoted cache LRU list 500.

Upon initiating (at block 1060) the operation to stage the track to the cache 140, the cache manager 142 stages (at block 1062) the target track into the cache 140 from the storage 104. The staging of the actual track data from the storage 104 may have been initiated earlier before or during the operations of FIGS. 10a, 10b to manage the demoted cache LRU list 500 and demoted cache control block directory 700. The target track staged into the cache 140 is indicated (at block 1064) at the MRU end 402 of the cache LRU list 400. A cache control block $300_{ST}$ is generated (at block 1066) for the staged track. Control then proceeds to block 1068 to determine if there is a demoted cache control block $600_{ST}$ for the staged track that has a track format code 604 (or other track format information) that can be included in the cache control block $300_{ST}$ created for the staged track. A determination is made (at block 1068) of the entry $700_i$ in the demoted cache control block directory 700 that could have a demoted cache control block $600_{ST}$ for the staged track, which entry $700_i$ may be determined by applying a hash function to the track identifier of the staged track. The first demoted cache control block $600_{SEL}$ in the determined entry $700_i$ is selected (at block 1070). If (at block 1072) the track identifier 602 of the selected demoted cache control block $600_{SEL}$ matches the track identifier of the staged track, then the track format code 604 in the selected demoted cache control block $600_{SEL}$ is included (at block 1074) in the cache control block $300_{ST}$ for the staged track. The cache manager 142 may then perform (at block 1076) the operations at blocks 1010, 1016, 1018, and 1020 in FIG. 10a to remove demoted track information for the staged track, including removing the demoted cache control block $600_{ST}$ for the staged track, removing the staged track from the demoted cache LRU list 500, removing the indication of the demoted cache control block $600_{ST}$ from the demoted cache control block directory 700, and adjusting pointers 606, 608, 610 in other demoted cache control blocks $600_i$ that pointed to the demoted track or demoted cache control block $600_{ST}$ for the staged track because the staged track is no longer demoted but active in cache 140.

If (at block 1072) the selected demoted cache control block $600_{SEL}$ is not for the staged track and if (at block 1078) there is a next demoted cache control block $600_i$ in the entry $700_i$, which may be indicated in the pointer 610, then that next demoted cache control block is selected (at block 1080) and control returns to block 1070 to determine whether this next demoted cache control block $600_i$ is for the staged track. If (at block 1078) there are no further next demoted cache control blocks in the determined entry $700_i$ to consider, then the track format code 202 from a demoted track information cannot be used and the cache manager 142 reads (at block 1082) the metadata for the track from the storage 104 to determine the track format. From block 1076 after using the track format code 604 from the demoted cache control block for the staged track or after reading (at block 1082) the metadata for the staged track, control returns (at block 1084) to block 904 in FIG. 9 with staging complete to perform the read/write operation with respect to the staged track.

With the embodiments of FIGS. 10a, 10b, and 10c, the track format code for a track demoted from cache can be saved and later used when the demoted track is staged back into cache. This allows the track metadata format to be quickly determined for the demoted track staged back into cache without having to read the metadata for the track from storage. The computer performance for cache operations, particularly staging, are substantially improved and latency reduced by determining the track metadata format and layout of a track being staged into cache without having to read the metadata for the track.

Figure 11:
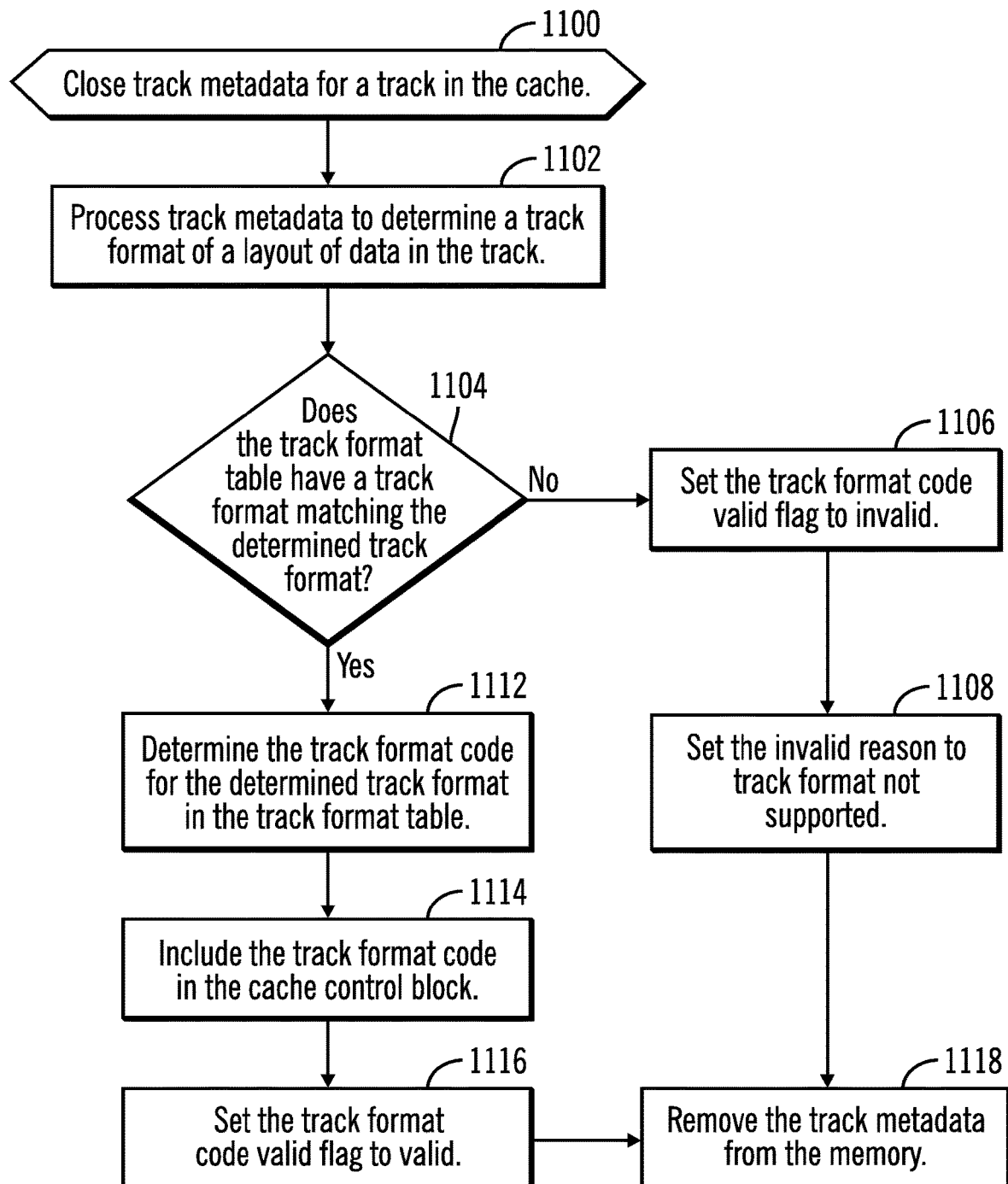
FIG. 11 illustrates an embodiment of operations to close track metadata and determine a track format code for the track in cache of the closed track metadata.

FIG. 11 illustrates an embodiment of operations performed by the cache manager 142 when closing the track metadata for a track in the cache 140, which involves destaging the track metadata to the storage 104 if changed. Upon closing (at block 1100) the track metadata for a track in the cache 140, the cache manager 140 processes (at block 1102) the track metadata to determine a track format or a layout of data in the track. If (at block 1104) the track format table 200 does not have a track format 204 matching the determined track format from the track metadata, which may happen if the determined track format is irregular, then the track format code valid flag 316 is set (at block 1106) to invalid and the invalid reason 318 is set to indicate that the track format is not supported. In such situation, read/write requests to the track having an irregular format are only processed when received through the second channel via network host adaptor 134.

If (at block 1104) the track format table has a track format 204 matching the determined track format from the track metadata, then the cache manager 142 determines the track format code 202 for the determined track format 204 in the track format table 200 and includes the track format code 202 in the field 314 in the cache control block $300_i$. The track format code valid flag 316 is set (at block 1116) to valid. From block 1108 or 1116, control proceeds to block 1118 to destage the track metadata from the memory 138 if modified or discard if not modified.

With the operations of FIG. 11, the track format information may be indicated in the cache control block $300_i$ with a track format code 202 having a limited number of bits to index track format metadata 204 describing track layout in a track format table 200, where the track metadata itself would not fit into the cache control block $300_i$. For future read/write accesses, if a valid track format code 314 is provided, then the cache manager 142 may use that code 314 to obtain with low latency the track format metadata 204 from the track format table 200 without having to read the track metadata from the storage 104 and process to determine the track format.

Storage Mirroring Environment

Figure 12:
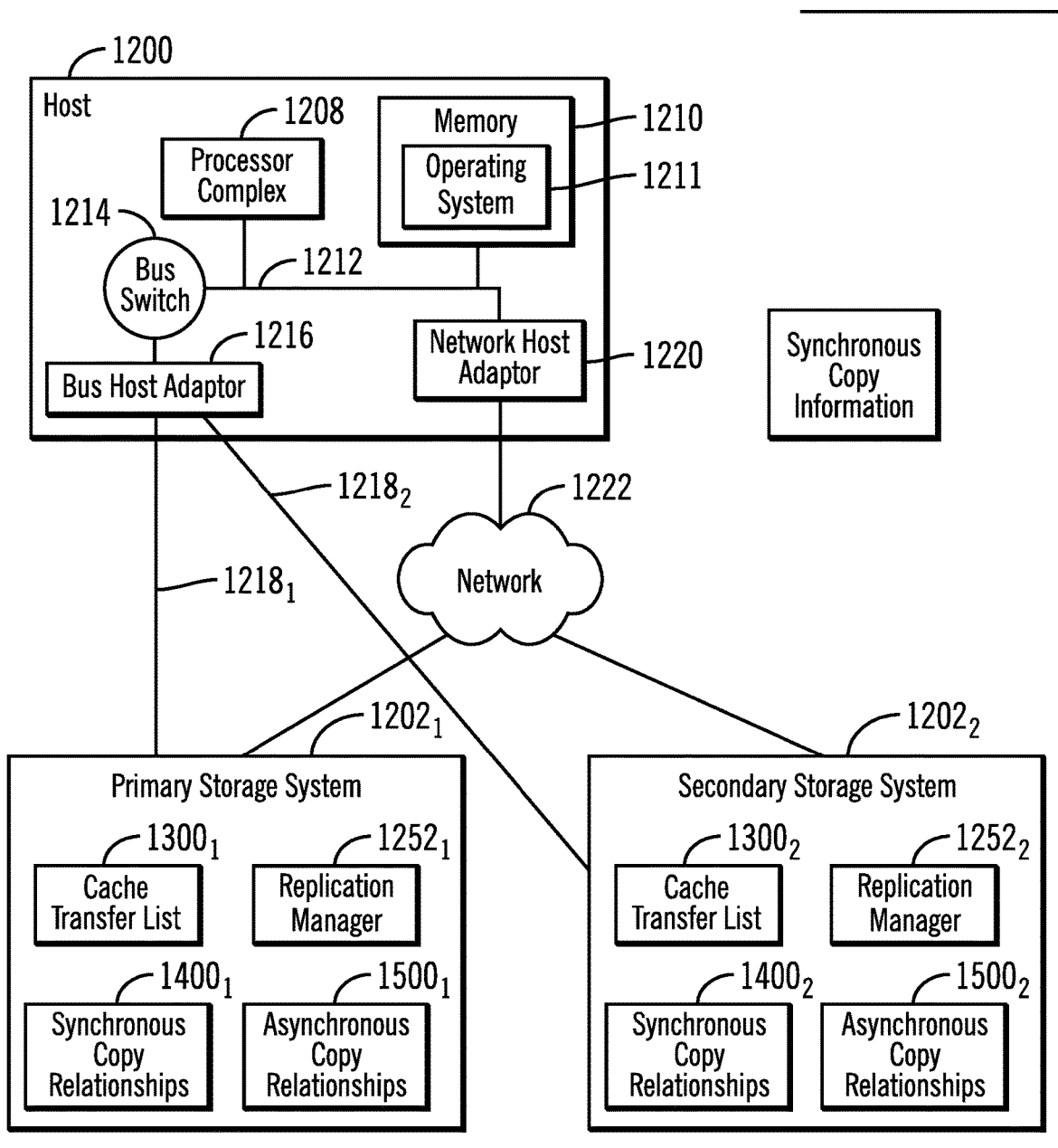
FIG. 12 illustrates an embodiment of a storage environment in which a primary storage system mirrors data to a secondary storage system.

FIG. 12 illustrates an embodiment of the storage environment of FIG. 1 of a host 1200 having components 1208, 1210, 1211, 1212, 1214, 1216, 1220 that comprise the components 108, 110, 111, 112, 114, 116, 120 of the host 100 described with respect to FIG. 1. The embodiment of FIG. 12 additionally includes a primary storage system $1202_1$ and a secondary storage system $1202_2$, where each of the primary $1202_1$ and secondary $1202_2$ storage systems include the components of the storage system 102 as described with respect to FIG. 1. Further, the host 1200 may include one or more bus host adaptors 1216 having links $1218_1$ and $1218_2$ to the primary $1202_1$ and secondary $1202_2$ storage systems, where the links $1218_1$ and $1218_2$ may comprise a PCIe over Ethernet or network type link to extend the PCIe link over a network, such as an Ethernet network, such as the ExpEther technology. The hosts 1200 may also communicate with the primary $1202_1$ and secondary $1202_2$ storage systems over the network 1222 via network host adaptors 1220 and 134.

Each of the primary $1202_1$ and secondary $1202_2$ storage systems would include, as shown and described with respect to FIGS. 1-7, a processor complex 136 and the components in the memory 138, including components 140, 142, 144, 146, 148, 200, 300, 400, 500, 600, and 700. Further, each of the primary $1202_1$ and secondary $1202_2$ storage systems would be capable of performing the operations of FIGS. 8-9, 10a, 10b, 10c, and 11 to manage their respective cache 140 and I/O requests directed thereto.

Each of the primary $1202_1$ and secondary $1202_2$ storage systems additionally include a cache transfer list $1300_1$, $1300_2$ that includes tracks and track format codes to transfer to the other system $1202_2$, $1202_1$ to provide the secondary storage system track format formation; a replication manager $1252_1$, $1252_2$ to replicate data to the other system $1202_2$, $1202_1$, respectively; synchronous copy relationships $1400_1$, $1400_2$ indicating source storage and a target storages in relationships such that writes to a source storage in a synchronous copy relationship need to be synchronously copied to the target storage before returning complete; and asynchronous copy relationships $1500_1$, $1500_2$ indicating source storages and target storages in asynchronous copy relationships, such that writes to the source storage are asynchronously copied to the target storage, and may be copied in consistency group such that the mirrored data is consistent as of a point-in-time.

The primary and secondary replication managers $1252_1$, $1252_2$ may create active copy relationships $1400_1$, $1400_2$, $1500_1$, $1500_2$ to manage the mirroring of data from the primary storage $104_1$ to the secondary storage system storage $104_2$ and vice versa.

The primary $1202_1$ and secondary $1202_2$ storage systems may each comprise an enterprise storage controller/server suitable for managing access to attached storage devices, such as, but not limited to, the International Business Machines Corporation's ("IBM") DS8000® storage system or other vendor storage servers known in the art. (DS8000 is a registered trademark of IBM in countries throughout the world).

In one embodiment, the replication managers $1252_1$, $1252_2$ may comprises a program for managing the mirroring of volumes across systems, such as, but not limited to, the IBM mirroring programs Geographically Dispersed Parallel Sysplex® (GDPS)®, and Tivoli® Storage Productivity Center for Replication (TPC-R) that define a replication session and copy pairs. Different types of techniques may be selected to copy the data, such as synchronous mirroring, asynchronous mirroring or point-in-time copying, or combinations of multiple of these different mirroring types.

During operations while both primary $1202_1$ and secondary $1202_2$ storage systems are operating, the bus host adaptor 1228 and network host adaptor 1234 would direct a received I/O request to the primary storage system $1202_1$, and the replication manager $1252_1$ of the primary storage system $1202_1$ would mirror data at the primary storage $104_1$ to the secondary storage system $1202_2$.

Figure 13:
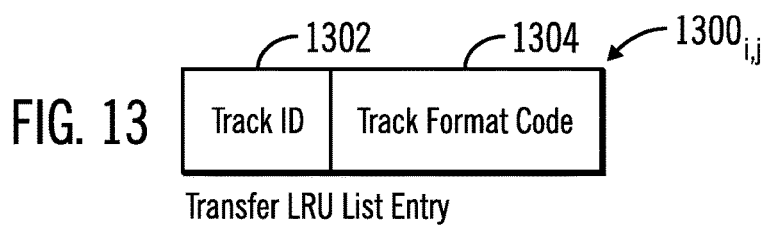
FIG. 13 illustrates an embodiment of an entry in a cache transfer list.

FIG. 13 illustrates an embodiment of an entry $1300_{i,j}$ in the cache transfer lists $1300_1$, $1300_2$, where entry j for storage system i, one of storage systems $1202_1$, $1202_2$, includes a track identifier (ID) 1302 and a track format code 1304 comprising one of the track format codes 202 in the track format table 202 indicating track format metadata 204 for the track 1302.

Figure 14:
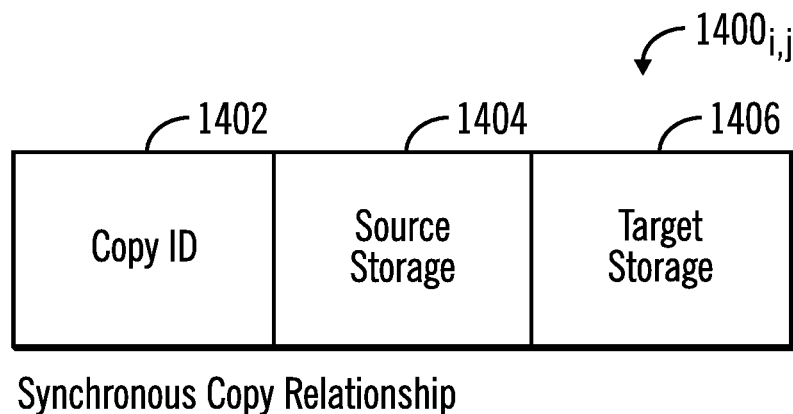
FIG. 14 illustrates an embodiment of a synchronous copy relationship.

FIG. 14 illustrates an instance of a synchronous copy relationship $1400_{i,j}$, where storage system i has an instance j of a synchronous copy relationship including a copy identifier 1402; a source storage 1404, e.g., a primary volume, in a primary storage at the primary storage system $1202_i$ from which data is synchronously copied; and a target storage 1406, e.g., secondary volume, in a secondary storage of the secondary storage system $1202_2$ to which tracks in the source storage 1404 are copied. For a synchronous copy relationship, the primary storage system $1202_1$ receiving the write request does not return complete until acknowledgment is received from the secondary storage system $1202_2$ that the write data is copied to the secondary storage $140_2$, which may be returned when the write data is written to a secondary cache $140_2$ at the secondary storage system $1202_2$ or when the write data is written to the secondary storage $104_2$.

Figure 15:
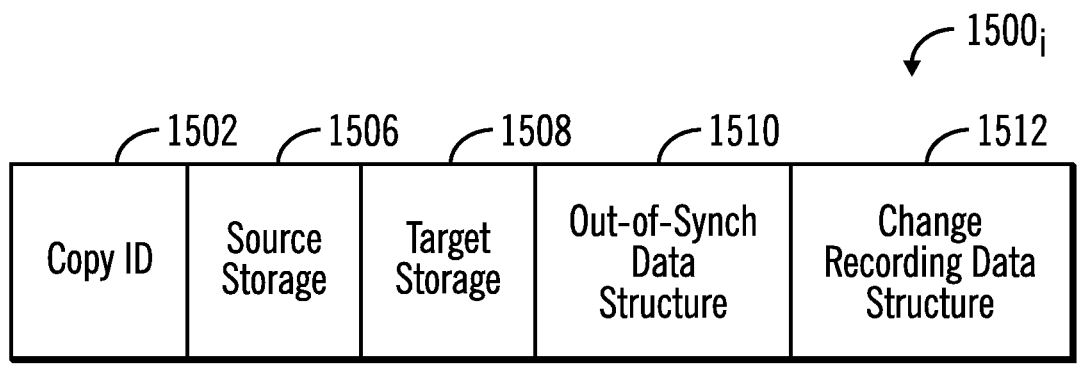
FIG. 15 illustrates an embodiment of an asynchronous copy relationship.

FIG. 15 illustrates an embodiment of an instance of an asynchronous copy relationship $1500_{i,j}$, where storage i has an instance j of a copy relationship including a copy identifier 1502 identifying an asynchronous copy created by the replication manager $1252_1$, $1252_2$; source storage 1506, e.g., primary volume, at the primary storage system $1202_1$, from which data is copied; target storage 1508, e.g., a secondary volume, at the second storage system $1202_2$ to which tracks in the source storage 1506 are copied; an out-of-synch data structure 1510, such as a bitmap, indicating tracks or other data units in the source storage 1506 that have been changed and need to be copied to the target storage 1508; and a change recording data structure 1512, such as a change recording bitmap, indicating source storage 1506 tracks that have been updated or changed to be included in the next consistency group, i.e., out-of-synch data structure 1510, to form.

To create a new consistency group, the change recording data structure 1512, indicating data updated while copying changed data for the current consistency group being formed, is merged with the out-of-synch data structure 1510, including changed data being copied for the current consistency group. After the merging, the change recording data structure 1512 is cleared to record new updates for a next consistency group while the data indicated as changed in the out-of-synch data structure 1510 is being copied to the target storage 1508 to form a new current consistency group at the target storage 1508.

Figure 16:
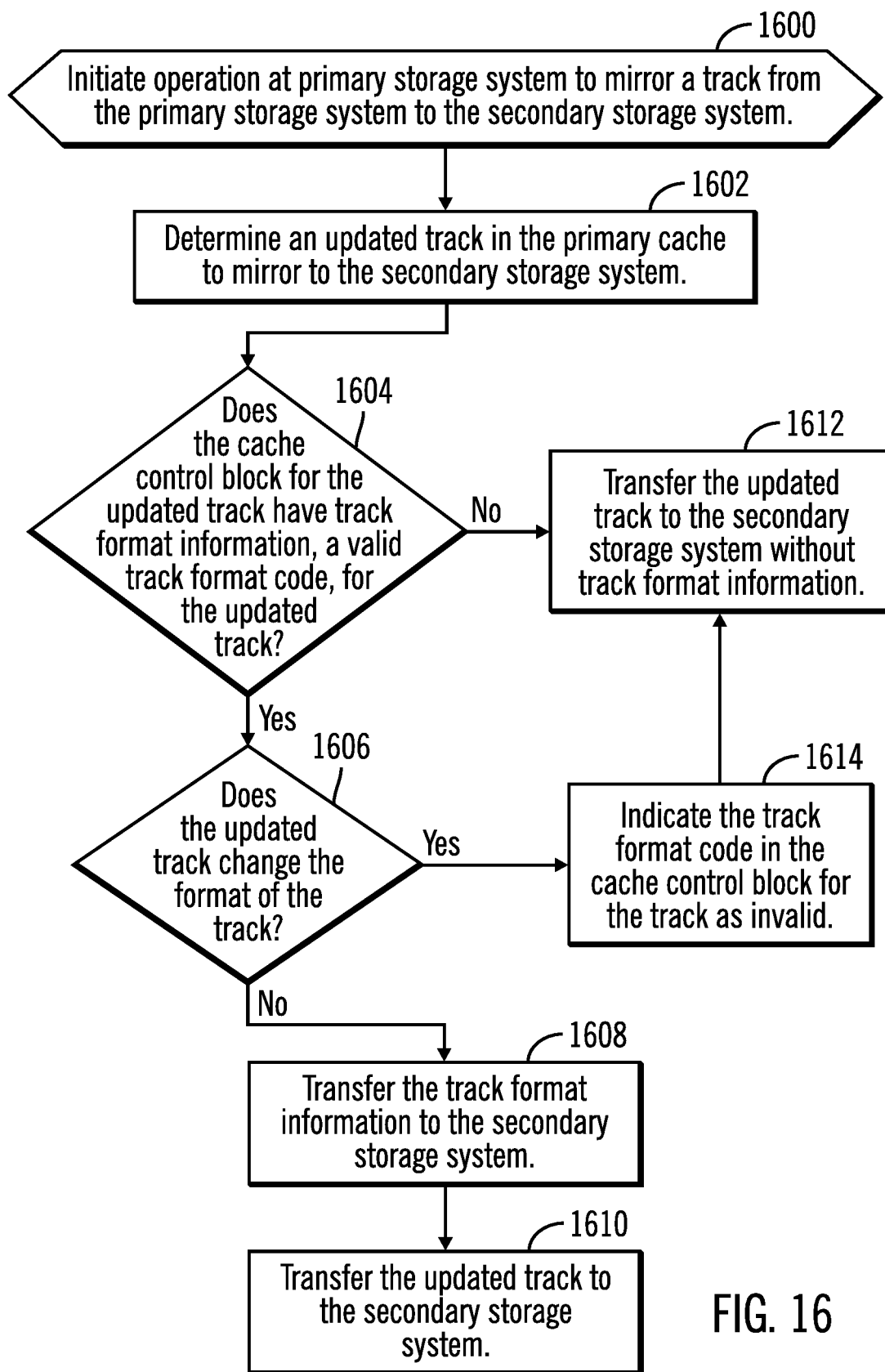
FIG. 16 illustrates an embodiment of operations at the primary storage system to transfer track format information with updated tracks being mirrored from the primary storage system to the secondary storage system.
Figure 17:
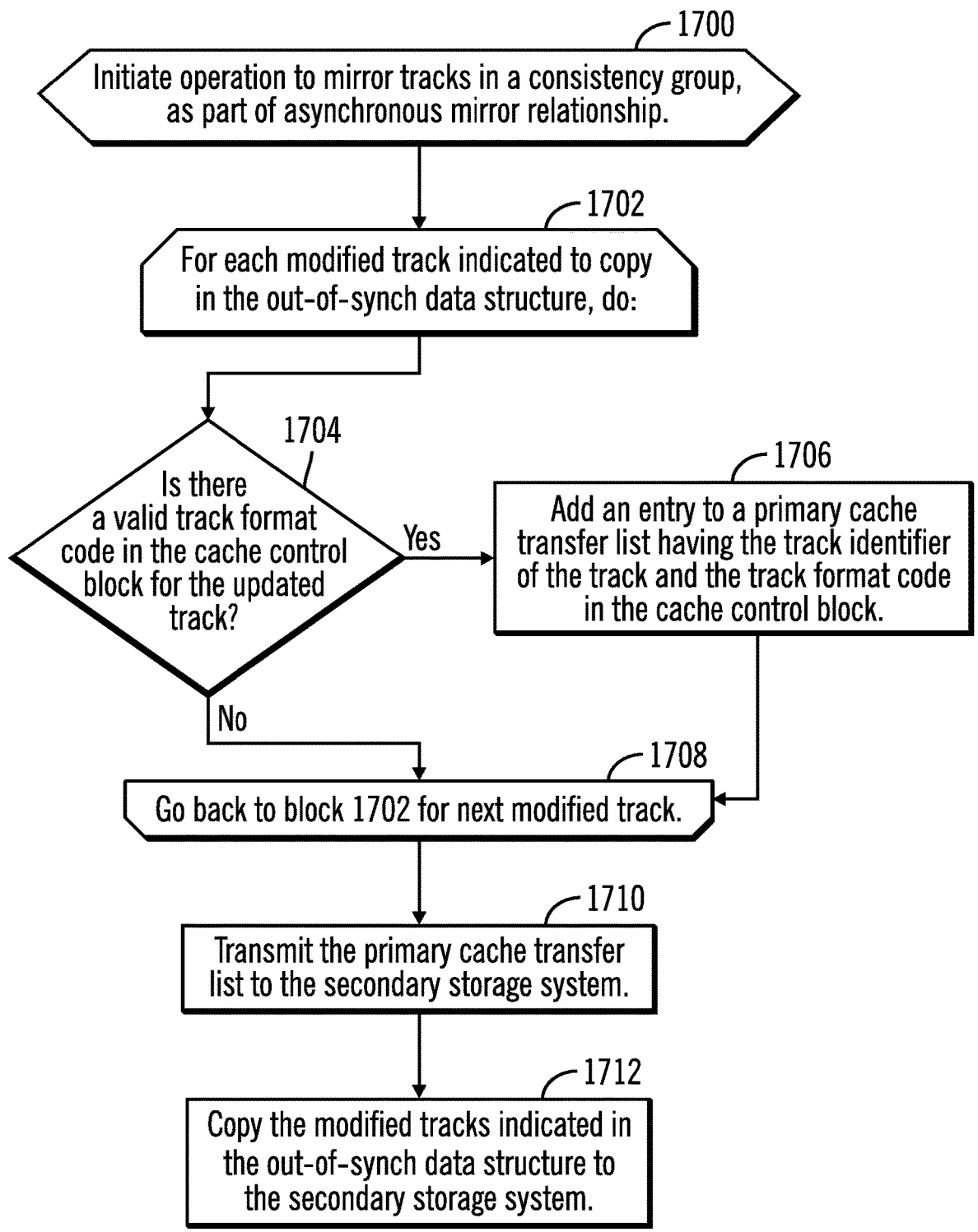
FIG. 17 illustrates an embodiment of operations at the primary storage system to transfer track format information with updated tracks being asynchronously mirrored from the primary storage system to the secondary storage system.
Figure 18:
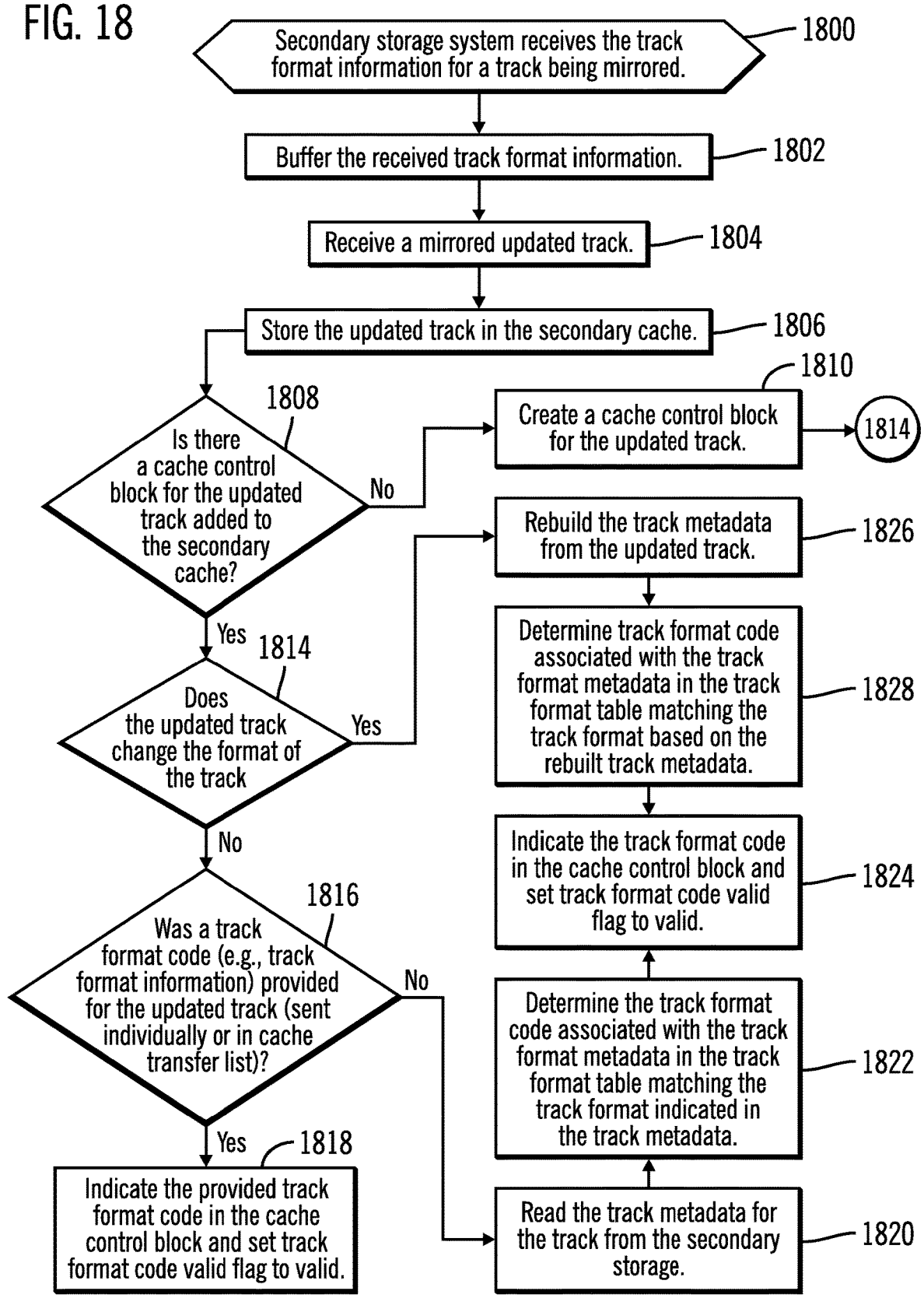
FIG. 18 illustrates an embodiment of operations at the secondary storage system to process received track format information and mirrored updated tracks from the primary storage system.

FIG. 16 illustrates an embodiment of operations performed by the replication manager $1252_1$, $1252_2$ to mirror updated tracks at the primary storage system $1202_1$ to the secondary storage system $1202_2$, for updated tracks in a synchronous $1400_{1,j}$ or asynchronous $1500_{1,j}$ relationship. FIGS. 16, 17, and 18 are described with respect to mirroring from the primary storage system $1202_1$ to the secondary storage system $1202_2$. However, the operations may also apply with respect to mirroring data from the secondary storage system $1202_2$ to the primary storage system $1202_1$ as part of copy relationships $1400_{2,j}$ and $1500_{2,j}$ maintained at the secondary storage system $1202_2$. The mirroring operations performed at blocks FIGS. 16, 17, and 18 may be performed with respect to updated tracks resulting from write operations to the primary storage system $1202_1$, which may occur during or after an initial synchronization to copy all of the tracks from the source storage to the target storage. Alternatively, the mirroring of the write operation may be performed for a point-in-time copy or snapshot that copies over changed data to be consistent as of a point-in-time. In FIGS. 16, 17, and 18, the replication managers $1252_1$, $1252_2$ may interact with the cache manager $142_1$, $142_2$ to perform operations with respect to cache control blocks $300_i$ for tracks in the primary cache $140_1$ and secondary cache $140_2$, respectively.

Upon (at block 1600) initiating at the primary storage system $1202_1$ an operation to mirror updated track or tracks, the replication manager $1252_1$ determines (at block 1602) an updated track or tracks in the primary cache to mirror to the secondary storage system $1202_2$, which may be mirrored as part of a synchronous $1400_{1,i}$ or asynchronous $1500_{1,i}$ copy relationship. If (at block 1604) the cache control block $300_i$ for the updated track has valid track format information, such as a track format code 314 indicated as valid in the track format code valid flag 316, and if (at block 1606) the updated track does not change the format of the track, then the replication manager $1252_1$ transfers (at block 1608) the track format information, i.e., track format code 314, to the secondary storage system $1202_2$. The updated track is also transferred (at block 1610) to the secondary storage system $1202_2$.

In a synchronous copy operation, the track format code 314 may be transferred in a message to the secondary storage system $1202_2$ before sending the updated track. Alternatively, the track format code 314 may be sent with the updated track. With a synchronous copy operation, the write operation is not completed until the secondary storage system $1202_2$ acknowledges the updated track was received.

If (at block 1604) the cache control block $300_i$ for the updated track does not have a valid track format code, i.e., the track format code valid flag 316 indicates there is no valid track format code 314, then the replication manager $1252_1$ transfers (at block 1612) the updated track to the secondary storage system $1202_2$ without track format information. If no track format information is provided, then the secondary storage system $1202_2$ needs to determine the track format information from track metadata for the track or rebuild the track format information. If (at block 1606) the update to the track modifies the format or layout of the track, which would render outdated the track format code 314 maintained for the track, then the replication manager $1252_1$ indicates (at block 1614) the track format code 314 as invalid, such as by setting the track format code valid flag 316 to invalid and proceeds to block 1612 to transfer the updated track without track format information.

With the embodiment FIG. 16, when mirroring data to a secondary storage system $1202_2$, the primary storage system $1202_1$ sends to the secondary storage system $1202_2$ the abbreviated track format information to be able to use for the mirrored updated tracks in the secondary cache $140_2$, and thus avoid having to read in the track metadata to determine the track format or layout.

FIG. 17 illustrates an embodiment of operations performed by the replication manager $1252_1$ to transfer track format information when performing an asynchronous mirror operation for an asynchronous copy relationship $1500_{1,j}$ to mirror updated tracks in the primary cache $140_1$ indicated in an out-of-synch data structure 1510. Upon initiating (at block 1700) an operation to mirror tracks in a consistency group indicated in an out-of-synch data structure 1510 of an asynchronous copy relationship $1500_{1,j}$, the replication manager $1252_1$ performs a loop of operations from blocks 1702 through 1708 for each of the updated tracks indicated in the out-of-synch data structure 1510. If (at block 1704) there is a valid track format code 316 in the cache control block $300_i$ for the updated track, i.e., having a valid track format code flag 314 indicating the code 316 is valid, then an entry $1300_{1,j}$ is added (at block 1706) to a first cache transfer list $1300_1$ having the track identifier 1302 of the updated track and the track format code 1304 from field 314 in the cache control block $300_i$ for the updated track being considered. After adding the entry $1300_{1,j}$ to the primary cache transfer list $1300_1$ (at block 1704) or if (at block 1704) there is no valid track format code 314 in the cache control block $300_i$, then control returns (at block 1708) to block 1702 consider a next updated track indicated in the out-of-synch data structure 1510 or proceed to block 1710 after all indicated updated tracks are considered. At block 1710, the replication manager $1252_1$ transmits the primary cache transfer list $1300_1$ to the secondary storage system $1202_2$ and copies (at block 1712) the modified tracks indicated in the out-of-synch data structure 1510 to the secondary storage system $1202_2$.

In one embodiment, the cache transfer list $1300_1$ may be sent to the secondary storage system $1202_2$ in a message before or while copying the updated tracks to the secondary storage system $1202_2$. In an alternative embodiment, the track format information, e.g., track format codes 314, may not be transferred in a cache transfer list $1300_1$ but instead each track format code 314 for an updated track may be sent with the updated track when the updated track is sent.

FIG. 18 illustrates an embodiment of operations performed by the replication manager $1252_2$ at the secondary storage system $1202_2$ to process a received mirrored track along with track format information if provided. Upon the secondary storage system $1202_2$ receiving (at block 1800) track information, e.g., track format code 314, for a track being mirrored, the received track format information is saved (at block 1802). For synchronous mirroring the track format information may comprise the track format code 314 for one track being mirrored and for asynchronous mirroring, the received track format information may comprise a primary cache transfer list $1300_1$ having track format codes 314 for multiple updated tracks that will be mirrored. Upon receiving (at block 1804) a mirrored updated track, which may be received with or after the track format information, e.g., track format code 202, the received updated track is stored (at block 1806) in the secondary cache $140_2$. Further, updated tracks may be received without track format information if not sent from the primary storage system $1202_1$. If (at block 1808) there is no cache control block $300_1$ for the updated track added to the secondary cache $140_2$, then a cache control block $300_i$ is created (at block 1810) for the updated track. If (at block 1808) there is already a cache control block $300_i$ for the updated track or after creating (at block 1810) a cache control block $300_i$, then if (at block 1814) the updated track does not change the format of the track, the replication manager $1252_2$ determines (at block 1816) whether a track format code 202 was provided for the updated track, such as sent individually before or with the updated track or in field 1302 in a cache transfer list $1300_1$. If (at block 1816) a track format code 202 was provided for the updated track, then the track format code 202 is indicated (at block 1818) in the cache control block $300_i$ in field 314.

If (at block 1816) a track format code was not provided for the updated track, then the replication manager $1252_2$ reads (at block 1820) the track metadata for the track from the secondary storage $104_2$ and determines (at block 1822) the track format code 202 associated with track format metadata 204 in the track format table 200 matching that of the track format indicated in the accessed track metadata. The determined track format code 202 is indicated (at block 1824) in the cache control block $300_i$ for the received updated track, and the track format valid flag 316 is set to valid.

If (at block 1814) the updated track changes the format of the track, then the secondary cache manager $142_2$ rebuilds (at block 1826) the track metadata from the updated track and determines (at block 1828) a track format code 202 associated with track format metadata 204 in the track format table 200 matching the track format indicated in the rebuilt track metadata. The determined track format code 202 is indicated (at block 1824) in field 314 in the cache control block $300_i$.

With the operations of FIG. 18, if the primary storage system $1202_1$ provides the track format information with a mirrored updated track, then the secondary storage system $1202_2$ includes that provided track format information, e.g., track format code 202, in the cache control block $300_i$ for the mirrored track added to the secondary cache $140_2$ to be available to use when the secondary storage system $1202_2$ processes a read or write request to the updated track in the secondary cache $140_2$. In this way, the secondary storage system $1202_2$ avoids latency to access and read track metadata for the track in the secondary cache $140_2$ from the secondary storage $104_2$ because the track format and layout may be determined from the track format information, such as track format code 316, included in the cache control block $300_i$ of the updated racks.

The present invention may be implemented as a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 19:
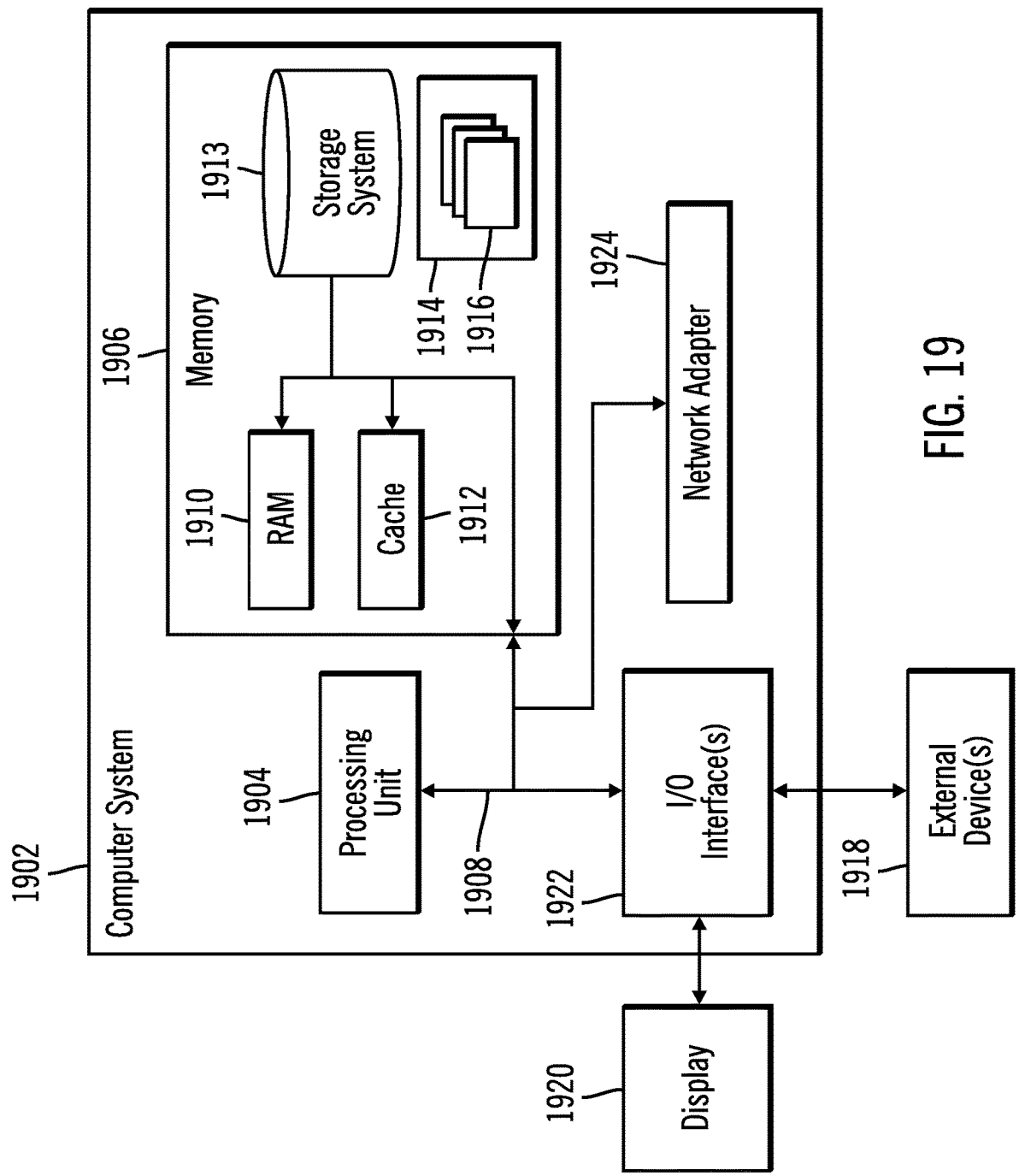
FIG. 19 illustrates an embodiment of a computer architecture used with described embodiments.

The computational components of FIGS. 1 and 12, including the host 100, 1200 and storage systems 102, 102$_2$, 1202$_1$ and 1202$_2$ may be implemented in one or more computer systems, such as the computer system 1902 shown in FIG. 19. Computer system/server 1902 may be described in the general context of computer system executable instructions, such as program modules, being executed by a computer system. Generally, program modules may include routines, programs, objects, components, logic, data structures, and so on that perform particular tasks or implement particular abstract data types. Computer system/server 1902 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 19, the computer system/server 1902 is shown in the form of a general-purpose computing device. The components of computer system/server 1902 may include, but are not limited to, one or more processors or processing units 1904, a system memory 1906, and a bus 1908 that couples various system components including system memory 1906 to processor 1904. Bus 1908 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 1902 typically includes a variety of computer system readable media. Such media may be any available media that is accessible by computer system/server 1902, and it includes both volatile and non-volatile media, removable and non-removable media.

System memory 1906 can include computer system readable media in the form of volatile memory, such as random access memory (RAM) 1910 and/or cache memory 1912. Computer system/server 1902 may further include other removable/non-removable, volatile/non-volatile computer system storage media. By way of example only, storage system 1913 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1908 by one or more data media interfaces. As will be further depicted and described below, memory 1906 may include at least one program product having a set (e.g., at least one) of program modules that are configured to carry out the functions of embodiments of the invention.

Program/utility 1914, having a set (at least one) of program modules 1916, may be stored in memory 1906 by way of example, and not limitation, as well as an operating system, one or more application programs, other program modules, and program data. Each of the operating system, one or more application programs, other program modules, and program data or some combination thereof, may include an implementation of a networking environment. The components of the computer 1902 may be implemented as program modules 1916 which generally carry out the functions and/or methodologies of embodiments of the invention as described herein. The systems of FIGS. 1 and 12 may be implemented in one or more computer systems 1902, where if they are implemented in multiple computer systems 1902, then the computer systems may communicate over a network.

Computer system/server 1902 may also communicate with one or more external devices 1918 such as a keyboard, a pointing device, a display 1920, etc.; one or more devices that enable a user to interact with computer system/server 1902; and/or any devices (e.g., network card, modem, etc.) that enable computer system/server 1902 to communicate with one or more other computing devices. Such communication can occur via Input/Output (I/O) interfaces 1922. Still yet, computer system/server 1902 can communicate with one or more networks such as a local area network (LAN), a general wide area network (WAN), and/or a public network (e.g., the Internet) via network adapter 1924. As depicted, network adapter 1924 communicates with the other components of computer system/server 1902 via bus 1908. It should be understood that although not shown, other hardware and/or software components could be used in conjunction with computer system/server 1902. Examples, include, but are not limited to: microcode, device drivers, redundant processing units, external disk drive arrays, RAID systems, tape drives, and data archival storage systems, etc.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for mirroring data from a primary storage system having a primary cache and a primary storage to a secondary storage system having a secondary cache and a secondary storage, the computer program product comprising a computer readable storage medium having computer readable program code executed in the primary and the secondary storage systems to perform operations, the operations comprising:

determining, by the primary storage system, a track to mirror from the primary storage system to the secondary storage system;

determining, by the primary storage system, whether there is track format information for the track to mirror that the primary storage system maintains for caching the track to mirror in the primary cache, wherein the track format information indicates a format of data and a layout of the data in the track to mirror from track metadata for the track to mirror;

sending, by the primary storage system, the track format information to the secondary storage system, in response to determining there is the track format information;

mirroring, by the primary storage system, the track to mirror to the secondary storage system;

storing, by the secondary storage system, a mirrored track mirrored from the primary storage system in the secondary cache;

creating, by the secondary storage system, a cache control block for the mirrored track;

determining, by the secondary storage system, whether the primary storage system provided track format information for the mirrored track;

including, by the secondary storage system, the track format information in the cache control block for the mirrored track in response to determining that the primary storage system provided track format information for the mirrored track; and using, by the secondary storage system, the track format information for the track in the secondary cache when processing a read or write request to the mirrored track.

2. The computer program product of claim 1, wherein the track format information comprises a track format code defined in a primary track format table at the primary storage system and a secondary track format table at the secondary storage system associating track format codes with track format metadata.

3. The computer program product of claim 1, wherein the track to mirror comprises an updated track in the primary cache, wherein the operations further comprise:

determining, by the primary storage system, whether the updated track modifies the format of the track;

invalidating, by the primary storage system, the track format information maintained for the track in the primary cache in response to determining that the updated track modifies the format of the track, wherein the invalidated track format information for the track to mirror is not sent to the secondary storage system when mirroring the updated track to the secondary storage system;

rebuilding, by the secondary storage system, track metadata for the updated track modifying the format of the track;

determining, by the secondary storage system, track format information from the track metadata rebuilt from the updated track; and including, by the secondary storage system, the determined track format information in a cache control block for the updated track in the secondary cache.

4. The computer program product of claim 1, wherein the track to mirror comprises an updated track updated by a write operation, wherein the track to mirror is mirrored to the secondary storage as part of a synchronous mirror operation where the write operation does not complete until the updated track is mirrored to the secondary storage system, wherein the sending the track format information comprises:

sending, by the primary storage system, a message to the secondary storage system including the track format information for the updated track before mirroring the updated track to the secondary storage system.

5. The computer program product of claim 1, wherein the track to mirror comprises an updated track updated by a write operation, wherein the track to mirror is mirrored to the secondary storage as part of a synchronous mirror operation where the write operation does not complete until the updated track is mirrored to the secondary storage system, wherein the track format information is sent to the secondary storage system with the mirroring of the updated track.

6. The computer program product of claim 1, wherein the operations further comprise:

indicating, by the primary storage system, updated tracks to mirror to the secondary storage system in synchronization information;

determining, by the primary storage system, updated tracks to mirror for which track format information is maintained;

generating, by the primary storage system, a cache transfer list; and for each determined updated track of the determined updated tracks, including, by the primary storage system, an entry in the cache transfer list including a track identifier and the track format information for the determined updated track, wherein the sending the track format information comprises sending the cache transfer list to the secondary storage system, and wherein the sending the track to mirror comprises sending the updated tracks indicated in the synchronization information to the secondary storage system.

7. The computer program product of claim 6, wherein the operations further comprise:

storing, by the secondary storage system, received updated tracks mirrored from the primary storage system in the secondary cache;

generating by the secondary storage system, a cache control block for each of the updated tracks mirrored to the secondary cache;

determining, by the secondary storage system, whether the cache transfer list includes track format information for the updated tracks; and including, by the secondary storage system, the track format information for the received updated tracks indicated in the cache transfer list in the cache control blocks for the received updated tracks in response to the determining that the cache transfer list includes the track format information for the updated tracks.

8. The computer program product of claim 6, wherein the sending the cache transfer list to the secondary storage system comprises:

sending, by the primary storage system, a message to the secondary storage system including the cache transfer list before mirroring the updated tracks to the secondary storage system for which track format information is provided in the cache transfer list.

9. A storage environment, including:
a primary storage system having a primary cache and a primary storage;
a secondary storage system having a secondary cache and a secondary storage;
wherein the primary storage system is to execute first computer program instructions to perform operations, the operations comprising:
  determining a track to mirror from the primary storage system to the secondary storage system;
  determining whether there is track format information for the track to mirror that the primary storage system maintains for caching the track to mirror in the primary cache, wherein the track format information indicates a format of data and layout of the data in the track to mirror from track metadata for the track to mirror;
  sending the track format information to the secondary storage system in response to determining there is the track format information; and
  mirroring the track to mirror to the secondary storage system; and
wherein the secondary storage system is to execute second computer program instructions to perform:
  storing, by the secondary storage system, a mirrored track mirrored from the primary storage system in the secondary cache;
  creating, by the secondary storage system, a cache control block for the mirrored track;
  determining, by the secondary storage system, whether the primary storage system provided track format information for the mirrored track; and
  including, by the secondary storage system, the track format information in the cache control block for the mirrored track in response to determining that the primary storage system provided track format information for the mirrored track; and
  using the track format information for the track in the secondary cache when processing a read or write request to the mirrored track.

10. The storage environment of claim 9, wherein the track format information comprises a track format code defined in a primary track format table at the primary storage system and a secondary track format table at the secondary storage system associating track format codes with track format metadata.

11. The storage environment of claim 9, wherein the track to mirror comprises an updated track in the primary cache, wherein the primary storage system is further to execute the first computer program instructions to perform:
  determining whether the updated track modifies the format of the track; and
  invalidating the track format information maintained for the track in the primary cache in response to determining that the updated track modifies the format of the track, wherein the invalidated track format information for the track to mirror is not sent to the secondary storage system when mirroring the updated track to the secondary storage system; and
wherein the secondary storage system is further to execute the second computer program instructions to perform:
  rebuilding track metadata for the updated track modifying the format of the track;
  determining track format information from the track metadata rebuilt from the updated track; and
  including the determined track format information in a cache control block for the updated track in the secondary cache.

12. The storage environment of claim 9, wherein the primary storage system is further to execute the first computer program instructions to perform:
  indicating updated tracks to mirror to the secondary storage system in synchronization information;
  determining updated tracks to mirror for which track format information is maintained;
  generating a cache transfer list; and
  for each determined updated track of the determined updated tracks, including an entry in the cache transfer list including a track identifier and the track format information for the determined updated track, wherein the sending the track format information comprises sending the cache transfer list to the secondary storage system, and wherein the sending the track to mirror comprises sending the updated tracks indicated in the synchronization information to the secondary storage system.

13. A method for mirroring data from a primary storage system to a secondary storage system comprising:
  determining, by the primary storage system, a track to mirror from the primary storage system to the secondary storage system;
  determining, by the primary storage system, whether there is track format information for the track to mirror that the primary storage system maintains for caching the track to mirror in a primary cache, wherein the track format information indicates a format of data and layout of the data in the track to mirror from the track metadata for the track to mirror;
  sending, by the primary storage system, the track format information to the secondary storage system, in response to determining there is the track format information;
  mirroring, by the primary storage system, the track to mirror to the secondary storage system;
storing, by the secondary storage system, a mirrored track mirrored from the primary storage system in a secondary cache;
  creating, by the secondary storage system, a cache control block for the mirrored track;
  determining, by the secondary storage system, whether the primary storage system provided track format information for the mirrored track;
  including, by the secondary storage system, the track format information in the cache control block for the mirrored track in response to determining that the primary storage system provided track format information for the mirrored track; and
  using, by the secondary storage system, the track format information for the track in the secondary cache when processing a read or write request to the mirrored track.

14. The method of claim 13, wherein the track format information comprises a track format code defined in a primary track format table at the primary storage system and a secondary track format table at the secondary storage system associating track format codes with track format metadata.

15. The method of claim 13, wherein the track to mirror comprises an updated track in the primary cache, further comprising:
- determining, by the primary storage system, whether the updated track modifies the format of the track;
- invalidating, by the primary storage system, the track format information maintained for the track in the primary cache in response to determining that the updated track modifies the format of the track, wherein the invalidated track format information for the track to mirror is not sent to the secondary storage system when mirroring the updated track to the secondary storage system;
- rebuilding, by the secondary storage system, track metadata for the updated track modifying the format of the track;
- determining, by the secondary storage system, track format information from the track metadata rebuilt from the updated track; and
- including, by the secondary storage system, the determined track format information in a cache control block for the updated track in the secondary cache.

16. The method of claim 13, further comprising:
- indicating, by the primary storage system, updated tracks to mirror to the secondary storage system in synchronization information;
- determining by the primary storage system, updated tracks to mirror for which track format information is maintained;
- generating, by the primary storage system, a cache transfer list; and
- for each determined updated track of the determined updated tracks, including, by the primary storage system, an entry in the cache transfer list including a track identifier and the track format information for the determined updated track, wherein the sending the track format information comprises sending the cache transfer list to the secondary storage system, and wherein the sending the track to mirror comprises sending the updated tracks indicated in the synchronization information to the secondary storage system.

* * * * *